(12) United States Patent
Shi et al.

(10) Patent No.: US 11,570,628 B2
(45) Date of Patent: Jan. 31, 2023

(54) METHOD AND APPARATUS FOR ADJUSTING A RECEPTION BEAM

(71) Applicant: Huawei Technologies Co., Ltd., Shenzhen (CN)

(72) Inventors: Ping Shi, San Diego, CA (US); Xiaoyin He, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/890,815

(22) Filed: Jun. 2, 2020

(65) Prior Publication Data

US 2020/0322812 A1   Oct. 8, 2020

Related U.S. Application Data

(63) Continuation of application No. PCT/CN2019/074047, filed on Jan. 31, 2019.

(60) Provisional application No. 62/634,589, filed on Feb. 23, 2018, provisional application No. 62/787,070, filed on Dec. 31, 2018.

(51) Int. Cl.
*H04W 16/28* (2009.01)

(52) U.S. Cl.
CPC .................................. *H04W 16/28* (2013.01)

(58) Field of Classification Search
CPC .. H04W 16/28; H04W 72/046; H04L 4/0048; H04B 7/0617
See application file for complete search history.

(56) References Cited

U.S. PATENT DOCUMENTS

| | | | |
|---|---|---|---|
| 10,097,252 B2 * | 10/2018 | Jo ......................... | H04B 7/0617 |
| 2010/0136985 A1 * | 6/2010 | Inoue .................... | H04W 16/08 |
| | | | 455/446 |
| 2014/0204902 A1 * | 7/2014 | Maltsev ............ | H04W 36/0083 |
| | | | 370/331 |

(Continued)

FOREIGN PATENT DOCUMENTS

| | | |
|---|---|---|
| CN | 103052086 A | 4/2013 |
| CN | 103748799 A | 4/2014 |

(Continued)

OTHER PUBLICATIONS

Notice of Allowance dated Jul. 2, 2020, U.S. Appl. No. 15/896,993, filed Feb. 14, 2018.

(Continued)

*Primary Examiner* — Muthuswamy G Manoharan
(74) *Attorney, Agent, or Firm* — Vierra Magen Marcus LLP

(57) ABSTRACT

A user equipment (UE) is configured to perform a method for adjusting a reception beam. The UE performs receiving first communication signals from a base station using the reception beam having the first reception beam direction, wherein the first communication signals comprise beam direction change information; adjusting the reception beam from the first reception beam direction to a second reception beam direction in accordance with the beam direction change information; and receiving second communication signals from the base station based on the reception beam having the second reception beam direction. Through the method, the UE may actively adjust the reception beam direction based on relative movement between base station beam and itself.

18 Claims, 16 Drawing Sheets

(56) References Cited

U.S. PATENT DOCUMENTS

| | | | | |
|---|---|---|---|---|
| 2015/0351103 | A1* | 12/2015 | Kim | H04W 16/28 455/452.1 |
| 2016/0066197 | A1 | 3/2016 | Park et al. | |
| 2017/0195893 | A1* | 7/2017 | Lee | H04L 5/006 |
| 2017/0302341 | A1* | 10/2017 | Yu | H04W 72/0446 |
| 2019/0379440 | A1* | 12/2019 | Wong | H01Q 25/002 |
| 2020/0221319 | A1* | 7/2020 | Kang | H04B 7/088 |

FOREIGN PATENT DOCUMENTS

| | | |
|---|---|---|
| CN | 103814529 A | 5/2014 |
| CN | 105992236 A | 10/2016 |
| CN | 106454871 A | 2/2017 |
| CN | 107078782 A | 8/2017 |
| WO | 2017146758 A1 | 8/2017 |

OTHER PUBLICATIONS

Office Action dated May 19, 2021, Chinese Application No. 201980013377.1.
Office Action dated Nov. 25, 2021, Chinese Patent Application No. 201980013377.1.

\* cited by examiner

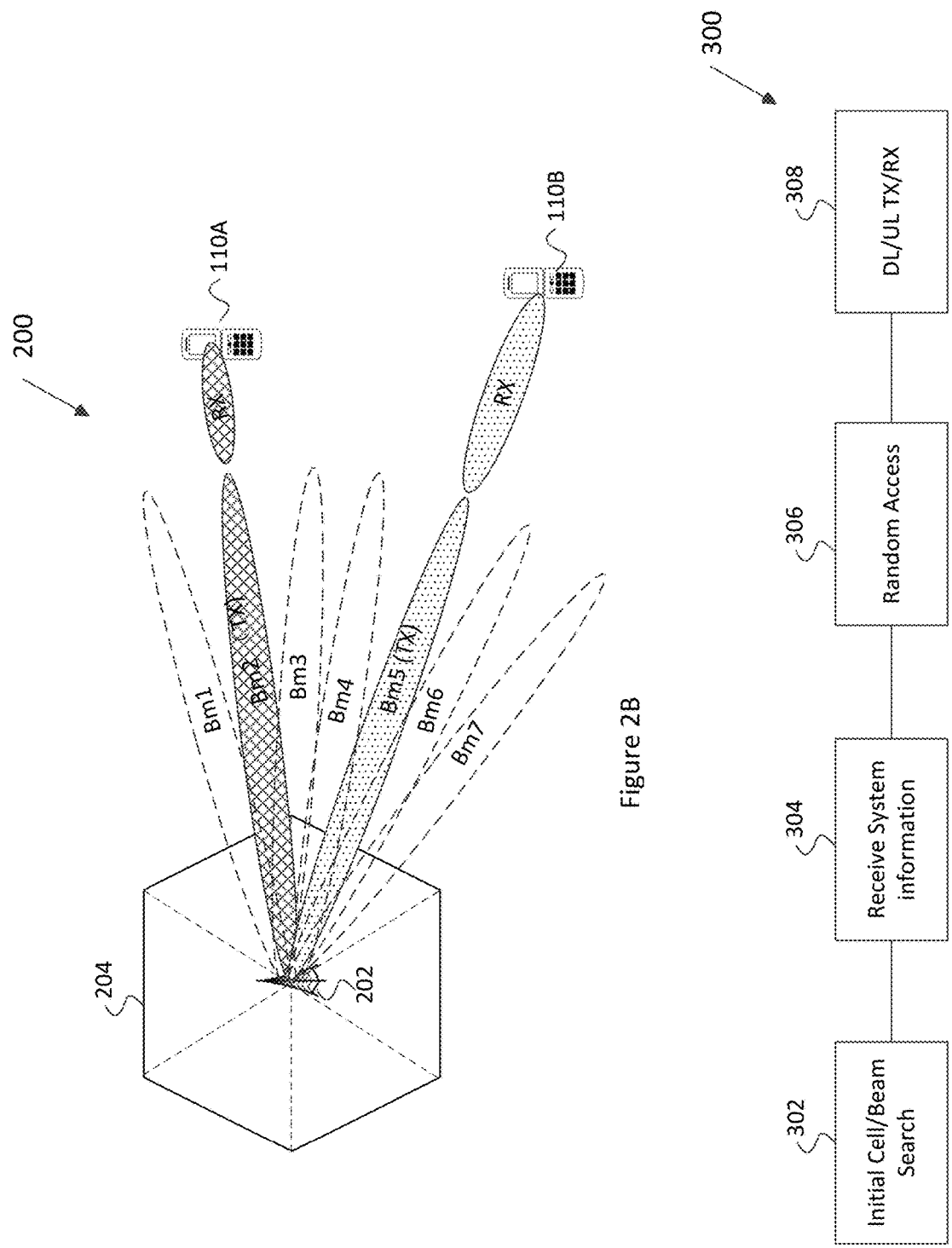

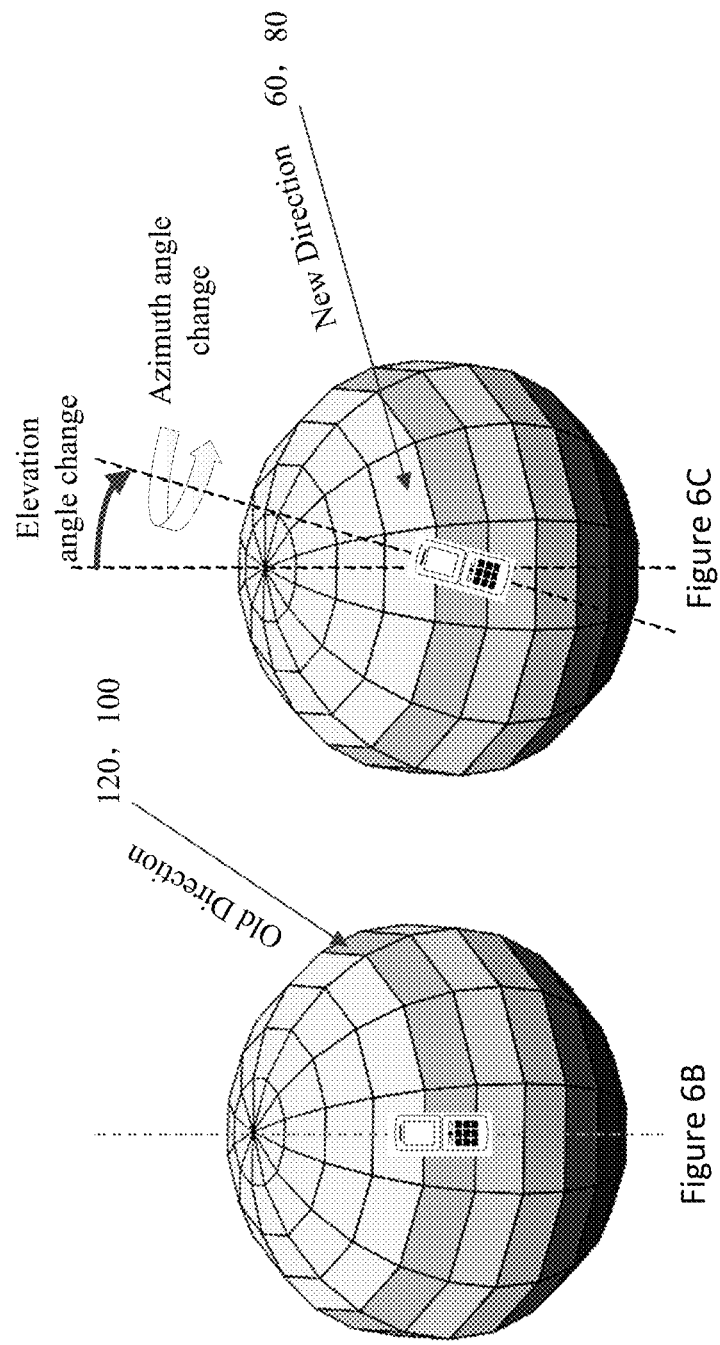

METHOD AND APPARATUS FOR ADJUSTING A RECEPTION BEAM

CROSS-REFERENCE TO RELATED APPLICATIONS

This application is a continuation of and claims the benefit of priority to International Application No. PCT/CN2019/074047, filed Jan. 31, 2019, and entitled "A Method and Apparatus for Adjusting a Reception Beam", which application claims the benefit of priority to U.S. Provisional Patent Application No. 62/634,589, filed Feb. 23, 2018, and entitled "Fast Test Mode Beam Alignment for Mobile Devices", and U.S. Provisional Patent Application No. 62/787,070, filed Dec. 31, 2018, and entitled "A Method and Apparatus for Adjusting a Reception Beam", which applications are hereby incorporated by reference.

TECHNICAL FIELD

The disclosure generally relates to technology for wireless communication, especially to a method and apparatus for adjusting a user equipment (UE) beam transmission and reception parameters for receiving and transmitting signals from an UE antenna.

BACKGROUND

Advanced wireless communication systems and devices employ highly directional antenna systems to improve antenna gain, using, for example, millimeter wave (mmWave) communications such as 5G NR and 802.11 ad/ay. Generally, the signals that drive the different antennas during transmission of the antenna system are weighted differently, for example, in terms of signal phase and amplitude to create a beam shape. Similarly, the amplitude and phase of received signal components are weighted differently to emphasize signals received according to a specified beam shape and direction. Beam shaping for transmitting and receiving can increase throughput by reducing interference.

Due to the nature of mmWaves, however, environmental factors significantly impact the transmission of the signals during beamformed communications more so that other types of signals. In beamformed communications, beam steering is used to change the direction of the main lobe of a radiation pattern of the phased array antenna is used. A receiver must then adjust its beam direction in a corresponding manner to maintain beam alignment with the transmitted beam by the transmitter. If the beam alignment between transmitter and receiver is lost, a beam forming protocol process for re-aligning the beams is required. This protocol process will require time to re-establish the radio link to align the beams if the misaligned beam cannot support the required link budget or capacity. In the prior art, a base station tracks a UE to adjust its beam to the UE but beam misalignment may still occur thereby requiring the beam forming protocol process steps to re-establish the beam alignment. Undergoing this beam forming protocol process, however, interferes with communications and may even render the UE and base station incapable of communicating data while the protocol process is executed.

BRIEF SUMMARY

A first aspect of an example embodiment includes a method performed by a user equipment (UE). In the method, the UE performs determining a first reception beam direction of a reception beam; receiving first communication signals from a base station using the reception beam having the first reception beam direction, wherein the first communication signals comprise beam direction change information; adjusting the reception beam from the first reception beam direction to a second reception beam direction in accordance with the beam direction change information; and receiving second communication signals from the base station based on the reception beam having the second reception beam direction. Through the solution provided, the UE may adjust its beam direction in response to the change of the beam direction, following the relative motion between UE and base station. Correspondingly, UE may actively adjust the reception beam direction based on relative angular movement between base station beam and itself.

A second aspect of an example embodiment includes method performed by a base station. In the method, the base station transmits a first communication signal to the UE through a transmission beam of the base station, with the first communication signal including beam direction change information, with the transmission beam having a first transmission beam direction; and transmits a second communication signal through the transmission beam changed to a second transmission beam direction. Through the solution provided, the base station may notify the beam direction change information via a transmission beam having a first beam direction directed by the transmission beam, so that the UE may adjust its beam direction in response to the change of the beam direction towards the UE.

A third aspect of an example embodiment includes device, which includes a non-transitory memory storage comprising instructions; and one or more processors in communication with the memory, wherein the one or more processors execute the instructions to: to perform the steps performed by the UE in the first aspect of an example embodiment.

A fourth aspect of an example embodiment includes UE. Wherein the terminal device includes the function of the terminal device in the first aspect of an example embodiment. The functions may be realized by hardware, or may be realized by software which are performed by hardware. And the hardware or the software include one or more module corresponding to the functions.

A fifth aspect of an example embodiment includes a computer storage media. Where the computer storage media stores instructions performed by the terminal device in the first aspect of an example embodiment, and stores the program performed in the first or the fourth aspect of an example embodiment.

BRIEF DESCRIPTION OF THE DRAWINGS

Aspects of the present disclosure are illustrated by way of example and are not limited by the accompanying Figures for which like references indicate elements.

FIG. 2B illustrates a base station with transmission beams according to an example embodiment.

FIG. 3 illustrates physical channels and transmitting signals on the physical channels in accordance with an example embodiment.

FIGS. 6B and 6C illustrates an example of a scenario in which, in UE fixed coordination, an angular movement of base station beam from the base station is changed according to this disclosure.

DETAILED DESCRIPTION

Figure 1:
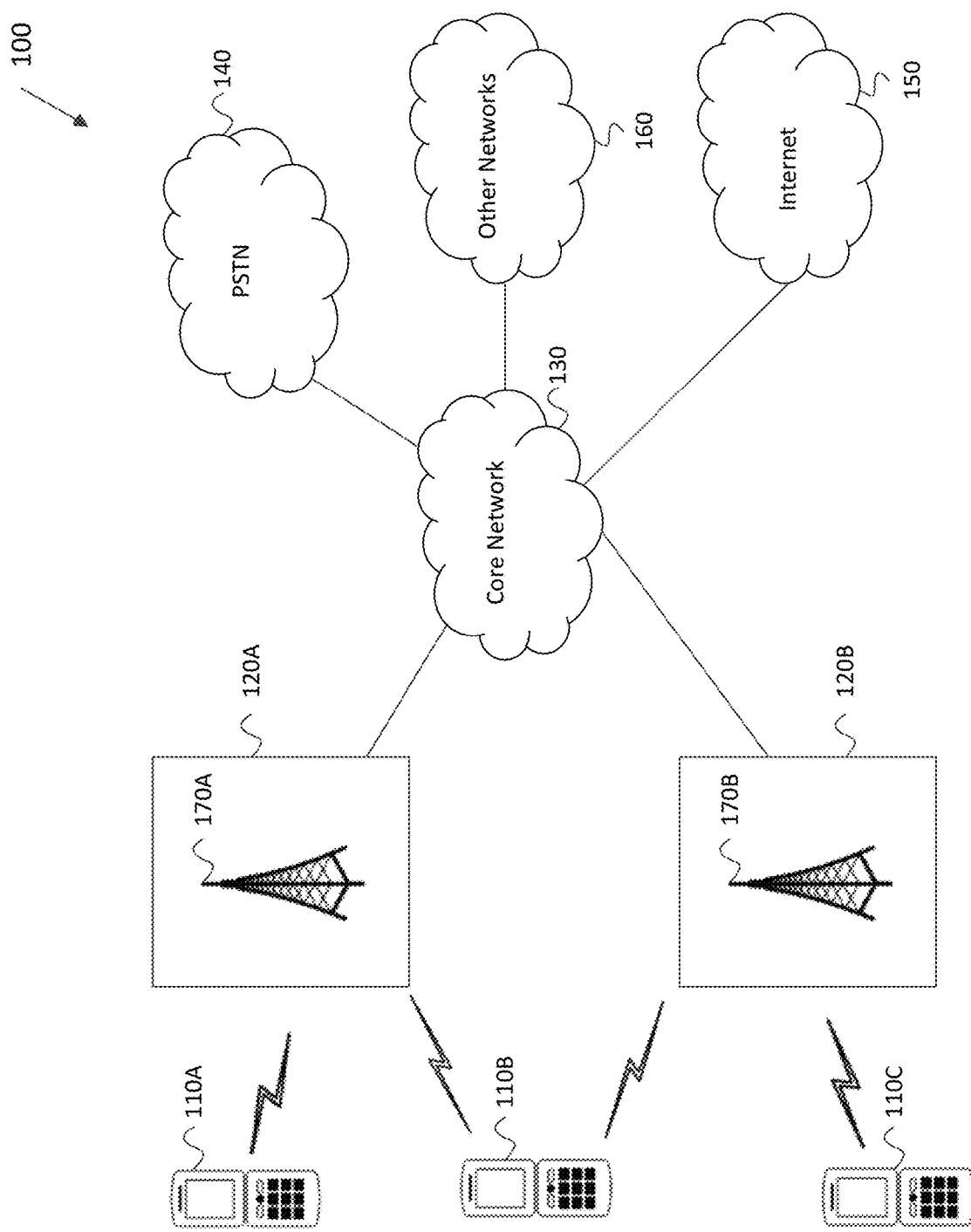
FIG. 1 illustrates a wireless network for communicating data.

The disclosure relates to technology for beam alignment using motion sensors in user equipment to determine angular movement of the measurement antenna in the base station.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

In systems as those described herein,

Phased array antennas are commonly used in commercial millimeter wave communication like a 5G new radio (NR).

The antenna array forms a directional millimeter wave beam, which provides better spatial energy efficiency and better receive sensitivity.

There are scenarios that base station will direct the base station beam to follow the UE's movement without change beam ID, for example, tracking the moving cars or people in moving training, or in test to characterize UE radio performance.

To characterize mmWave UE radio performance, an EIRP/EIS distribution over spherical space is used.

For each spherical angle, the UE will steer phased array antenna to point UE beam to the direction of a base station beam. EIRP/EIS will be measured over that direction. The Measurement of EIRP/EIS over spherical direction is implemented either by moving UE or moving both UE and measurement antennas. Multiple measurement antennas can be used to speed up the measurement.

In an active testing, the movement of the UE or the measurement antenna, or switching the measurement antenna will cause beam misalignment; the UE need to align the UE beam maximum to the measurement antenna maximal gain direction.

Time will be reserved for beam search and alignment. This alignment procedure will slow down the EIRP/EIS measurement, or at the risk of lower EIRP or higher EIS.

It is to be understood that the singular forms "a," "an," and "the" include plural referents unless the context clearly dictates otherwise. Thus, for example, reference to "a component surface" includes reference to one or more of such surfaces.

Some of the term involved in the embodiments of the present disclosure are as follows:

"Beam" may be understood as a spatial filter or a spatial parameter. The beam used to transmit the signal may be referred to as a transmission beam (Tx beam), which may be a spatial transmission filter (spatial domain transmission filter) or a spatial transmission parameter (airspace transmission parameter); a beam for receiving a signal may be called a reception beam (Rx beam) and can be a spatial receive filter (space-receiving filter) or a spatial receive parameter (spatial-domain receive parameter).

Beamforming is a signal preprocessing technique based on an antenna array. Beamforming forms a directional beam by adjusting the weighting coefficients of each element (each antenna) in the antenna array, so that significant array gain can be obtained. The beamforming technology may be a digital beamforming technique, an analog beamforming technique, or a hybrid digital/analog beamforming technique. The transmission beam may refer to a distribution of signal strengths formed in different directions of the space after the signal is transmitted through the antenna. The reception beam may refer to a signal intensity distribution of the wireless signal received from the antenna in different directions in space.

Beamforming may be divided into transmission beamforming performed by a base station, and reception beamforming performed by a UE. In general, transmission beamforming increases directivity by concentrating a propagation arrival area in a particular direction by using a plurality of antennas. A plurality of antennas may be arranged as an antenna array, and each antenna included in the antenna array may be referred to as an array element. The antenna array may be configured in various types such as a linear array and a planar array. When transmission beamforming is used, a transmission distance increases through an increase in signal directivity. Further, since the signal is hardly transmitted in another direction other than the directed direction, signal interference for the UE significantly decreases. The UE may perform beamforming for a received signal by using a reception antenna array. Reception beamforming concentrates reception of radio waves in a particular direction to increase received signal sensitivity incident from the corresponding direction and excludes signals incident from directions other than the corresponding direction from the received signal to provide a gain in blocking an interference signal.

Beamforming, by having a directional component, allows a direction of the beam to be changed to adjust the relative position between the receiving end and the transmitting end. The antenna array can realize the directional antenna equivalently by using a plurality of common antennas with a specific delay via adjusting the phase shifter of the antenna in the antenna array, the phase shifter of the antenna is adjusted based on the parameter of the reception beam in a specific direction.

The beam pair relationship is the pair relationship between the transmission beam and the reception beam, or the pair relationship between the spatial transmission filter and the spatial reception filter. A large beamforming gain can be obtained by transmitting signals between a transmission beam and a reception beam as the beam pair relationship.

In an example, the transmitting end (such as the base station) and the receiving end (such as the UE) may obtain a beam pairing relationship by using beam training. The base station may send use a beam scanning technique to transmit the reference signal and the UE may also use a beam scanning technique to receive the reference signal. Specifically, the base station may form different directional beams in space, and may produce multiple transmission beams with different directivity to transmit the reference signals through different directional beams. This allows power of the reference signal in the direction in which the transmit beam is directed to be maximized. The UE can also form different directional reception beams in space by beamforming, and adjust beamforming parameters to generate multiple reception beams in different directions to determine a direction in which the reception beam is maximized and has the best signal strength or quality.

During operations after such a process, the transmission beam and the reception beam are aligned or nearly aligned. For the downlink beamforming, a best beam pair of one or more transmission beams of the base station and one or more reception beams of UE generated in various directions according to a structure of each of the UE and the base station should be selected and then a downlink beam tracking process in which both the base station and the UE recognize information on the beam pair should be performed.

FIG. 1 illustrates a wireless network for communicating data. The communication system 100 includes user equipment 110A-110C, radio access networks (RANs) 120A-120B, a core network 130, a public switched telephone network (PSTN) 140, the Internet 150, and other networks 160. Additional or alternative networks include private and public data-packet networks including corporate intranets. While certain numbers of these components or elements are shown in the Figure, any number of these components or elements may be included in the system 100.

In one embodiment, the wireless network may be a fifth generation (5G) network including at least one base station (such as 5G base station) may employ orthogonal frequency-division multiplexing (OFDM) and a transmission time interval (TTI) shorter than 1 ms (for example, in the order of approximately 100 or 200 microseconds), to communicate with the communication devices. In general, a base station may also be used to refer any of the eNB and the 5G BS (gNB), an access point, a transportation point and so on. In addition, the network may further include a network server for processing information received from the communication devices via the at least one eNB or gNB.

System 100 enables multiple wireless users to transmit and receive data and other content. The system 100 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The user equipment (UE) 110A-110C are configured to operate and/or communicate in the system 100. For example, the user equipment 110A-110C are configured to transmit and/or receive wireless signals or wired signals. Each user equipment 110A-110C represents any suitable end user device and may include such devices (or may be referred to) as a user equipment/device, wireless transmit/receive unit (UE), mobile station, fixed or mobile subscriber unit, pager, cellular telephone, personal digital assistant (PDA), smartphone, laptop, computer, touchpad, wireless sensor, wearable devices or consumer electronics device.

In the depicted embodiment, the RANs 120A-120B include one or more base stations 170A, 170B (collectively, base stations 170), respectively. Each of the base stations 170 is configured to wirelessly interface with one or more of the UEs 110A, 110B, 110C to enable access to the core network 130, the PSTN 140, the Internet 150, and/or the other networks 160. For example, the base stations (BSs) 170 may include one or more of several well-known devices, such as a base transceiver station (BTS), a Node-B (NodeB), an evolved NodeB (eNB), a next (fifth) generation (5G) NodeB (gNB), a Home NodeB, a Home eNodeB, a site controller, an access point (AP), or a wireless router, or a server, router, switch, a transportation point, or other processing entity with a wired or wireless network.

In one embodiment, the base station 170A forms part of the RAN 120A, which may include other base stations, elements, and/or devices. Similarly, the base station 170B forms part of the RAN 120B, which may include other base stations, elements, and/or devices. Each of the base stations 170 operates to transmit and/or receive wireless signals within a particular geographic region or area, sometimes referred to as a "cell." In some embodiments, multiple-input multiple-output (MIMO) technology may be employed having multiple transceivers for each cell.

The base stations 170 (e.g. 170A and 170B) communicate with one or more of the user equipment 110A-110C over one or more air interfaces (not shown) using wireless communication links. The air interfaces may utilize any suitable radio access technology.

It is contemplated that the system 100 may use multiple channel access functionality, including for example schemes in which the base stations 170 and user equipment 110A-110C are configured to implement the Long Term Evolution wireless communication standard (LTE), LTE Advanced (LTE-A), and/or LTE Broadcast (LTE-B). In other embodiments, the base stations 170 and user equipment 110A-110C are configured to implement UMTS, HSPA, or HSPA+ standards and protocols. Of course, other multiple access schemes and wireless protocols may be utilized.

The RANs 120A-120B are in communication with the core network 130 to provide the user equipment 110A-110C with voice, data, application, Voice over Internet Protocol (VoIP), or other services. As appreciated, the RANs 120A-120B and/or the core network 130 may be in direct or indirect communication with one or more other RANs (not shown). The core network 130 may also serve as a gateway access for other networks (such as PSTN 140, Internet 150, and other networks 160). In addition, some or all of the user equipment 110A-110C may include functionality for communicating with different wireless networks over different wireless links using different wireless technologies and/or protocols.

The RANs 120A-120B may also include millimeter and/or microwave access points (APs). The APs may be part of the base stations 170 or may be located remote from the base stations 170. The APs may include, but are not limited to, a connection point (an mmW CP) or a base station 170 capable of mmW communication (e.g., a mmW base station). The mmW APs may transmit and receive signals in a frequency range, for example, from 24 GHz to 100 GHz, but are not required to operate throughout this range. As used herein, the term base station is used to refer to a base station and/or a wireless access point.

Generally, FIG. 1 represents a communication that utilizes the beam forming communications and processes as described in the present disclosure. More specifically, the disclosed apparatus and associated methods for maintaining beam alignment between a transmitter and a receiver may be utilized within the circuitry and devices of FIG. 1. Although FIG. 1 illustrates one example of a communication system, various changes may be made to FIG. 1. For example, the communication system 100 could include any number of user equipment, base stations, networks, or other components in any suitable configuration. It is also appreciated that the term user equipment may refer to any type of wireless device communicating with a radio network node in a cellular or mobile communication system. Non-limiting examples of user equipment are a target device, device-to-device (D2D) user equipment, machine type user equipment or user equipment capable of machine-to-machine (M2M) communication, laptops, PDA, iPad, Tablet, mobile terminals, smart phones, consumer peripheral equipment (CPE) laptop embedded equipped (LEE), laptop mounted equipment (LME) and USB dongles.

Figure 2A:
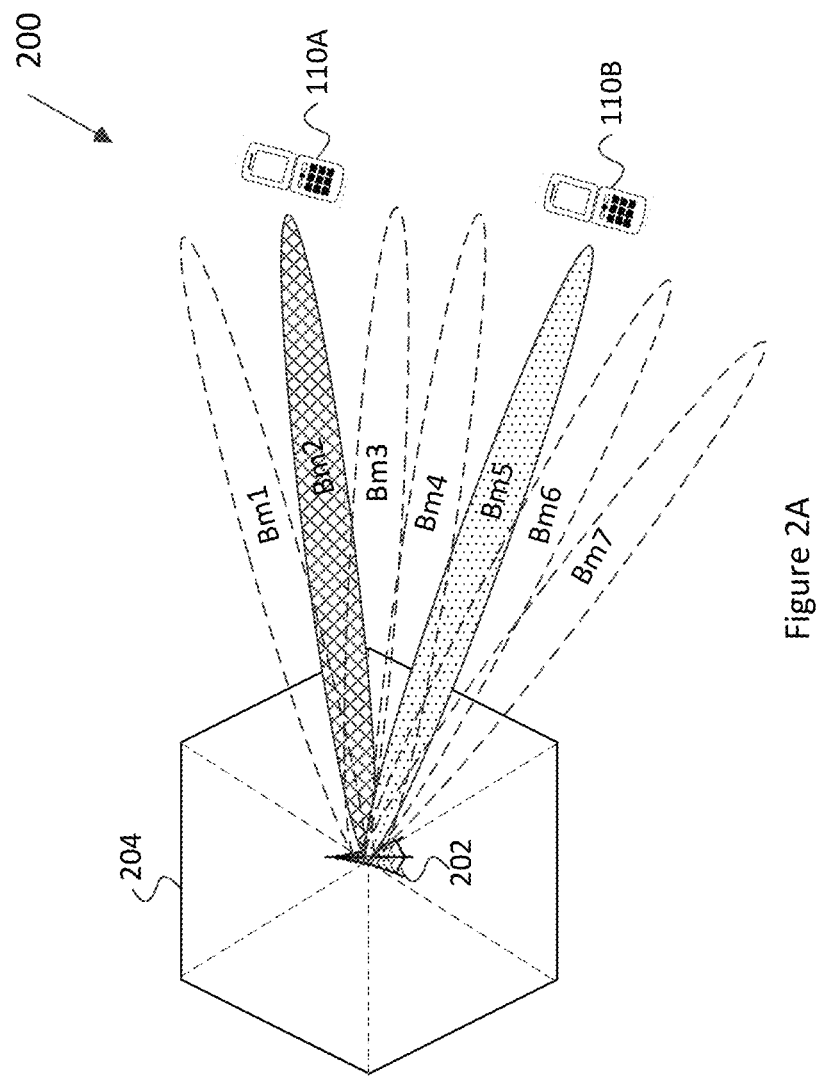
FIG. 2A illustrates a base station with transmission beams according to an example embodiment.

FIG. 2A illustrates a base station with transmitting and reception beams according to an example embodiment. The transmission beam of the base station is referred to the reception beam of the UE, and the reception beam of the base station is referred to the transmission beams of the UE. The base station 202 manages a cell 204 divided into one or more sectors as its service coverage area and forms multiple transmission/reception (Tx/Rx) beams BM1-BM7 using beamforming schemes, such as digital beamforming (e.g., Transmit (Tx) pre-Inverse Fast Fourier Transform (pre-IFFT) beamforming/Receive (Rx) post-Fast Fourier Transform (post-FFT) beamforming), analog beamforming (e.g., Tx post-IFFT beamforming/Rx pre-FFT beamforming), or a combination thereof. The base station 202 transmits the beamformed signals by sweeping them simultaneously or successively, for example, beginning with beam BM1 and ending with BM7, and is described in more detail with reference to FIGS. 4A-4C.

The base station 202 may include, or may be associated with, one or more antennas (not shown) configured for transmitting and/or receiving wireless communication signals, blocks, frames, transmission streams, packets, messages and/or data. In one embodiment, the antennas of the base station may include an antenna array configured for generating one or more directional beams, for example, for communicating over one or more beamformed links.

In other embodiments, the antennas of the base station may include any other antenna configurations, structure and/or arrangement of one or more antenna elements, components, units, assemblies and/or arrays. For example, the antennas of the base station may include a phased array antenna, an omni-directional antenna, a single element antenna, a multiple-element antenna, a set of switched beam antennas, and/or the like. The antenna array may include one or more antenna elements, which may be configured, for example, for creating a highly directional antenna beam pattern. The antenna elements may be placed, for example, in an array, e.g., a two-dimensional array, of a predefined geometry or may be configured to form one or more highly directive antenna patterns or beams, which may be steered by setting appropriate signal phases at the antenna elements and/or by baseband processing, or by selecting one from a set of switched beam antennas.

In other embodiment, a dual polarized antenna element may be employed. Here, a single element of an antenna array may contain multiple polarized antennas. Multiple elements may be combined together to form an antenna array. The polarized antennas may be radially spaced. For example, two polarized antennas may be arranged perpendicularly, to create a horizontally polarized antenna and a vertically polarized antenna.

In some embodiments, the base station 202 may be configured to control the antenna array to generate and steer one or more beams to be directed to one or more other devices, e.g., to a UE 110A or 110B. The base station 202 and the UE 110A may utilize the mmWave communication band to provide wireless connectivity for a relatively large coverage cell area 204.

The user equipment (UE), such as the user equipment 110A-110B served by the base station 202 may be configured to receive signals omni-directionally without supporting Rx beamforming, receive signals while supporting Rx beamforming by using one beamforming pattern each time, or receive signals while supporting Rx beamforming by simultaneously using a plurality of beamforming patterns in different directions.

If the user equipment 110A-110B does not support Rx beamforming, the user equipment 110A-110C measures the channel quality of a reference signal (RS) in each transmission beam of the base station 170 and reports the measurements to the base station 202. The base station 202 selects the best transmission beam for the user equipment 110A-110C from among a plurality of Tx beams of the base station. If the user equipment 110A-110C is configured to support Rx beamforming, the user equipment 110A-110C measures the channel qualities of multiple Tx beams received from the base station 202 for each reception beam pattern and reports a total or some high-ranked measurements of all Tx-Rx beam pairs to the base station 202. The base station 202 may allocate an appropriate Tx beam to the user equipment 110A-110C. If the user equipment 110A-110C is capable of receiving a plurality of Tx beams from the base station 202 or supporting a plurality of base station Tx-user equipment Rx beam pairs, the base station 202 may select a beam, taking into account spatial multiplexing, diversity transmission through repeated transmission or simultaneous transmission.

FIG. 2B illustrates a millimeter-wave mobile broadband (MMB) communication system 200 according to an embodiment of the disclosure. In the illustrated embodiment, the system 200 includes a base station 202, UEs 110A-110B. The base station 202 is configured to communicate with the UEs 110A and 110B.

The base station 202 and the UEs 110A-110B can use each antennas or antenna arrays to carry out beamforming. Antenna arrays can form beams with different widths, such as wide beam or narrow beam. A beam pair link between the base station 202 and the UEs 110A and 110B is established respectively. A beam pair link may be the link between the transmission beam of the base station 202 and the reception beam of the UE 110A.

In the downlink, the beamforming is performed based on transmission beamforming of the base station or a combination of the transmission beamforming of the base station and reception beamforming of the MS.

The embodiments in this disclosure can be also applied to base station-to-base station wireless communication and mobile station-to-mobile station wireless communication, and are not limited to the communications between base station and mobile station.

FIG. 3 illustrates physical channels and transmitting signals in accordance with an example embodiment. When user equipment 110A-110C (FIG. 1) is powered on or enters a new cell, such as cell 204 (FIG. 2), the user equipment 110 performs an initial cell search or beam search 302. The initial cell search 302 involves acquisition of synchronization to the base station 170 which may be, for example, abase station 170. Specifically, the user equipment 110 synchronizes its timing to the base station 170 and acquires a cell Identifier (ID) and other information by receiving a Primary Synchronization Channel (P-SCH) and a Secondary Synchronization Channel (S-SCH) from the base station 170. Subsequently, the user equipment 110 may acquire information broadcast in the cell by receiving a Physical Broadcast Channel (PBCH) from the base station 170. During the initial cell search, the user equipment 110 may monitor a downlink (DL) channel state by receiving a downlink reference Signal (DL RS).

After the initial cell search, the user equipment 110A-110C may acquire detailed system information at 304 by receiving a Physical Downlink Control Channel (PDCCH) and receiving a Physical Downlink Shared Channel (PDSCH) based on information included in the PDCCH.

If the user equipment 110A-110C initially accesses the base station 170 or has no radio resources for signal transmission to the base station 170, the user equipment 110A-110C may perform a random access procedure at 306 with the base station 170. During the random access procedure 306.

Upon completion of the above process, the user equipment 110A-110C may receive a PDCCH and/or a PDSCH from the base station 170 and transmit a Physical Uplink Shared Channel (PUSCH) and/or a PUCCH to the base station 170, which is a general DL and UL signal transmission procedure at 308. Specifically, the user equipment 110A-110C receives Downlink Control Information (DCI) on a PDCCH. The DCI includes, for example, control information such as resource allocation information for the user equipment 110A-110C.

The control information that the user equipment 110A-110C transmits to the base station 170 on the uplink (UL) channel or receives from the base station 170 on the DL channel includes a DL/UL ACKnowledgment/Negative ACKnowledgment (ACK/NACK) signal, a Channel Quality Indicator (CQI), a Precoding Matrix Index (PMI), a Rank Indicator (RI), etc. The control information, such as a CQI, a PMI, an RI, etc., may be transmitted on a PUSCH and/or a PUCCH.

With reference to the various Figures in the attachment to this disclosure, in mmWave communication, phased array antennas are widely used to meet radio link budget requirement. The communication is highly directional. For each transmission beam, there is an optimal reception beam of the UE. The transmission beam of the base station corresponds to the reception beam of the UE. In general, 3GPP defines the necessary network parameters to support three beam management processes to search and track the transmission beam of the base station. These processes will take time and there is at risk of a lost link for the extreme condition. There is a network capacity trade-off associated with the signals used to track the base station beam. Alternately, a UE can speed up the base station beam search and refinement, maintaining a good beam tracking by using the angular movement information generated from motion sensors including gyroscope and accelerometer. To characterize mobile device's radio performance, EIRP/EIS distribution over spherical space (CDF) is used besides the TRP/TIS. The UE is expected to align its best UE beam to the base station beam coming from every direction in a spherical space. The angular movement of the UE is the movement of the UE, with the movement may result angle change of the reception beam of the UE.

In order to get the spherical coverage, the EIRP/EIS test can be performed, with either the UE rotating, or both the measurement antenna and the UE rotating. When only the UE is rotating, the angular motion information from the UE is enough to adjust the UE beam (also refer to the reception beam of the UE). When both the UE and the measurement antenna (or the base station antenna) are rotating, the angular movement of measurement antenna information is not available to the UE, without extra signaling. The UE may not be able to track the movement of measurement antenna beam (the measurement of antenna beam may also refer to transmission beam of the base station) with just angular movement information from UE's sensor data. In another scenario, the base station needs to track the movement of the UE within a car or high speed train. The movement of the UE is predictable. The base station may configure and direct its transmission beam to follow the UE movement without using a different beam ID, thus reducing the beam handover overhead. For the UE, it will experience beam direction change from the same transmission beam ID. It is critical to adjust the reception beam to follow the beam direction change of the base station beam (the transmission beam of the base station) and maintain a good beam alignment. Typically, the UE will not be aware of the beam direction change using the base station signaling. The angular movement of the measurement antenna or the change information of base station beam relative the base station since the UE's motion sensors will not provide such information. The disclosure is to provide such information sent to the UE whenever there is a rotation of measurement antenna or there is change information of the base station beam. With this beam direction change information, the UE will determine the relative movement between the UE and the measurement antenna(s), or the relative movement between the UE and the base station beam, thus knows how to adjust the UE beam (refers to the reception beam of the UE) to track the measurement antenna beam or the base station beam (refers to the transmission beam of the base station). The UE beam adjustment involves monitoring the UE angular movement and tracking beam direction of the base station (also refers to the transmission beam direction) using selected best UE beams through the standard defined beam management procedures. Whenever there is a relative angular movement between the UE and the base station, and the UE knows the relative direction change in an azimuth angle and an elevation angle, the UE will be able to change the active beam according to the azimuth and evaluation angle change.

In a typical EIRP/EIS CDF measurement, a base station emulator will change the polarization of measurement antenna beam (also the transmission beam of the base station). This polarization change is equivalent to a rotation of the UE. The UE needs to realign the UE beam to correspond to the new polarization, even if the direction of the measurement antenna is the same. The UE beam is also referred a reception beam of the UE in the disclosure, is a spatial receive filter (space-receiving filter) or a spatial receive parameter (spatial-domain receive parameter). Or the UE beam is to a signal intensity distribution of the wireless signal received from the antenna in different directions in space. The disclosure is directed to a signal transmitted by the base station and received by the UE to identify the polarization through a signaling command or any signal from the base station. The UE may use two mapping tables for the two orthogonal polarizations, each polarization corresponds to a mapping table. After receiving the polarization change information of the transmission beam, the UE may switch to the other mapping table according to the signaling of polarization change from the base station.

Some existing solutions defined in 3GPP for beam management procedures are based on the signal quality. When there is a polarization change or relative movement between the UE and the measurement antenna for over-the-air performance (OTA) test, or between the UE and the base station, the base station or the base station emulator could configure training signal and training beams for UE to align the UE beam to the base station beam. The base station beam is referred to as the transmission beam of the base station in the disclosure. The UE beam is referenced as the reception beam of the UE in the disclosure. s The method for the UE to align the UE beam to the base station antenna requires time because the base station emulator has to wait for the completion of alignment for each measurement angle and polarization. It is time-consuming and could be problematic for the EIS testing. The wait time may not enough for the testing solution from different suppliers. This solution utilizes the angular movement information from sensors on the UE and from signaling and the polarization change signaling, and the solution can adjust the beam much faster than the existing solution.

Figure 4B:
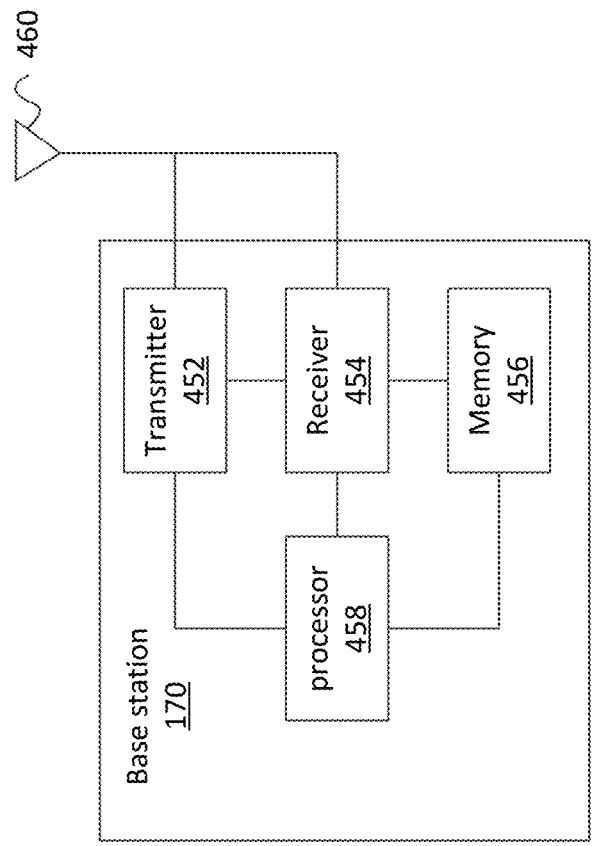
FIG. 4B illustrates an example of a base station that may implement the methods and teachings according to this disclosure.
Figure 4A:
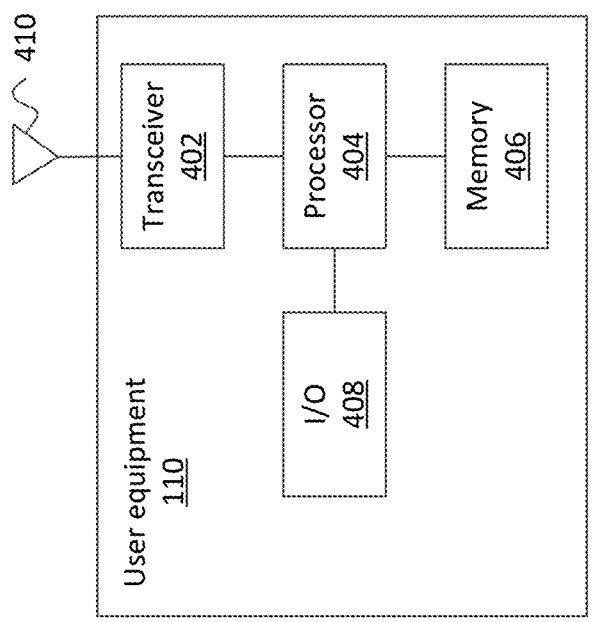
FIG. 4A illustrates an example of a user equipment that may implement the methods and teachings according to this disclosure.

FIG. 4A illustrates example the user equipment, UE, 110 that may implement the methods and hardware corresponding with the teachings according to this disclosure. As shown in FIG. 4A, the UE 110A includes at least one processor 404 that is coupled to communicate with a transceiver 402 for transmitting and receiving wireless communication signals, a memory 406 for receiving computer instructions to be executed by processor 404 and for storing and retrieving data. The processor 404 implements various processing operations of the UE 110A defined by the computer instructions stored in memory 406. For example, the processor 404 may perform signal coding, data processing, power control, input/output processing, or any other functionality enabling the UE 110A to operate in the system 100 (FIG. 1). Processor 404 may also communicate with input/output (I/O) 408 to receiving user selections and inputs and to produce information for consumption by the user. The I/O devices 408 facilitate interaction with a user. Each input/output device 1108 includes any suitable structure for providing information to or receiving information from a user, such as a speaker, a microphone, a keypad, a keyboard, a display, or a touchscreen.

The processor 404 may include any suitable processing or computing device configured to perform one or more operations. For example, the processor 404 may include a microprocessor, microcontroller, digital signal processor, field programmable gate array, or application specific integrated circuit.

The transceiver 402 is configured to modulate data or other content for transmission by at least one antenna 410. The transceiver 402 is also configured to demodulate data or other content received by the at least one antenna 410. Each transceiver 402 may include any suitable structure for generating signals for wireless transmission and/or processing signals received wirelessly. Each antenna 410 includes any suitable structure for transmitting and/or receiving wireless signals. It is appreciated that one or multiple transceivers 402 could be used in the UE 110, and one or more antennas 410 could be used in the UE 110. Although shown as a single functional unit, a transceiver 402 may also be implemented using at least one transmitter and at least one receiver, each having one or more analog signal paths.

The memory 406 stores instructions and data used, generated, or collected by the UE 110. For example, the memory 406 could store software or firmware instructions executed by the processor(s) 404 and data used to reduce or eliminate interference in incoming signals. Each memory 406 includes any suitable volatile and/or non-volatile storage and retrieval device(s). Any suitable type of memory may be used, such as random access memory (RAM), read-only memory (ROM), hard disk, optical disc, subscriber identity module (SIM) card, memory stick, secure digital (SD) memory card, and the like.

FIG. 4B illustrates an example of a base station 170 that may implement the methods and teachings according to this disclosure. As shown in the FIG. 4B, the base station 170 includes at least one processor 458, at least one transmitter 452, at least one receiver 454, one or more antennas 460, and at least one memory 456. The processor 458 implements various processing operations of the base station 170, such as signal coding, data processing, power control, input/output processing, or any other functionality. Each processor 458 includes any suitable processing or computing device configured to perform one or more operations. Each processor 458 could, for example, include a microprocessor, microcontroller, digital signal processor, field programmable gate array, or application specific integrated circuit.

Each transmitter 452 includes any suitable structure for generating signals for wireless transmission to one or more UEs or other devices. Each receiver 454 includes any suitable structure for processing signals received wirelessly from one or more UEs or other devices. Although shown as separate components, at least one transmitter 452 and at least one receiver 454 could be combined into a transceiver. Each antenna 460 includes any suitable structure for transmitting and/or receiving wireless signals. While a common antenna 460 is shown here as being coupled to both the transmitter 452 and the receiver 454, one or more antennas 460 could be coupled to the transmitter(s) 452, and one or more separate antennas 460 could be coupled to the receiver(s) 454. Each memory 456 includes any suitable volatile and/or non-volatile storage and retrieval device(s).

Figure 4C:
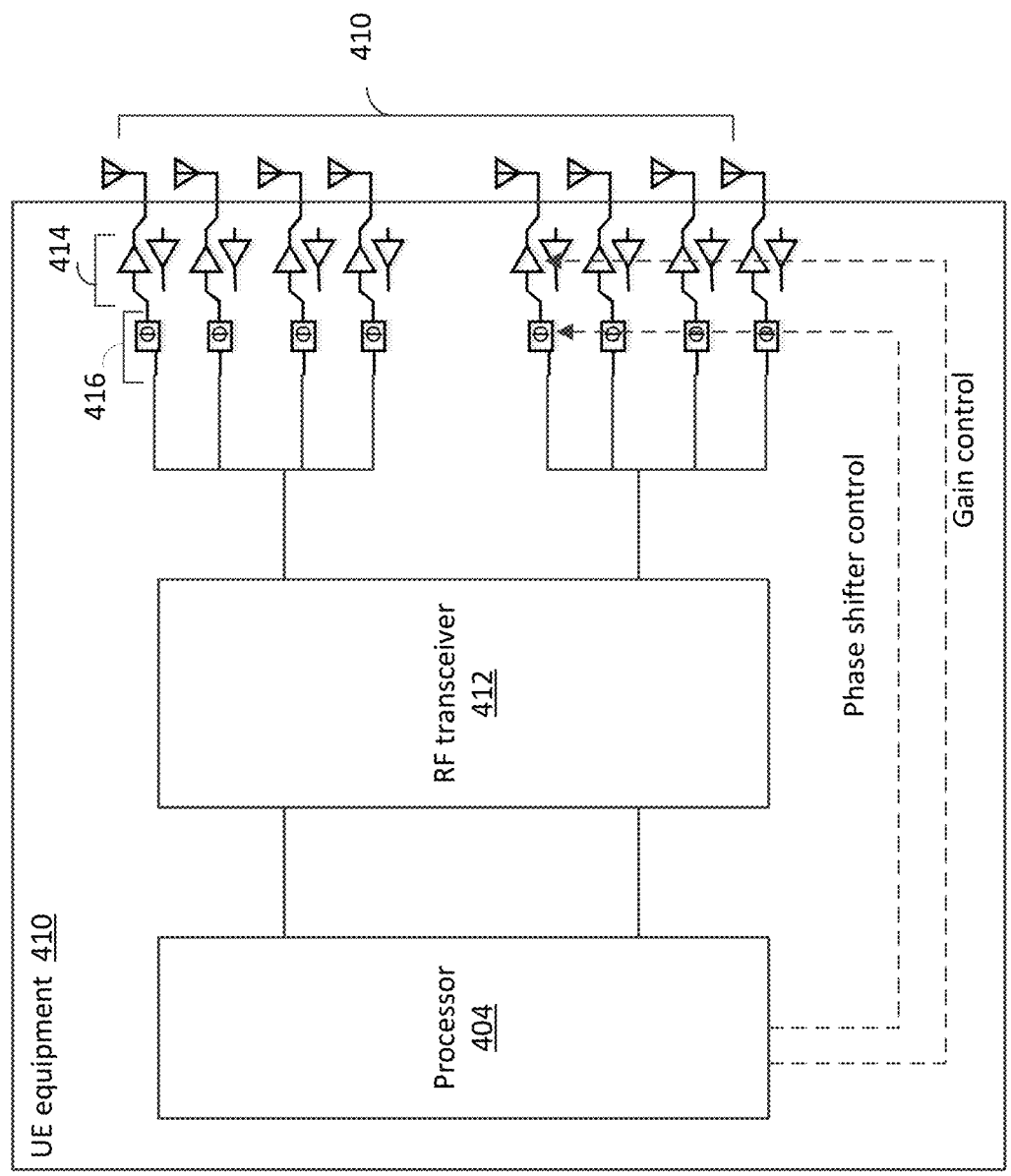
FIG. 4C illustrates an example of a user equipment that may implement the methods and teachings according to this disclosure.

FIG. 4C illustrates an embodiment of a UE that may implement the methods and teachings according to this disclosure. As shown in FIG. 4C, the UE 410 includes at least one processor 404. The processor 404 implements various processing operations of the UE 410. For example, the processor 404 may perform signal coding, data processing, power control, input/output processing, or any other functionality enabling the UE 410 to operate in a communication system such as system 100 of FIG. 1. The processor 404 may include any suitable processing or computing device configured to perform one or more operations. For example, the processor 404 may include a microprocessor, microcontroller, digital signal processor, field programmable gate array, an application specific integrated circuit, or a modem baseband. The processor 404 may send a baseband or intermediate frequency signal to a radio frequency (RF) transceiver 412 for conversion by the RF and for transmission via an antenna array utilizing beam forming transmission processing.

The UE 410 also includes at least one radio frequency (RF) transceiver 412. The RF transceiver 412 may be same or different from the transceiver 402. The RF transceiver 412 is configured to modulate data or other content for transmission by at least one antenna 410 via RF signals. The RF transceiver 412 is also configured to demodulate data or other content received by the at least one antenna 410. The RF transceiver 412 may include any suitable structure for generating signals for wireless transmission and/or processing signals received wirelessly. Each antenna 410 includes any suitable structure for transmitting and/or receiving wireless signals. It is appreciated that one or multiple transceivers 402 could be used in the UE 110, and one or multiple antennas 410 could be used in the UE 410. Although shown as a single functional unit, a transceiver 402 may also be implemented using at least one transmitter and at least one separate receiver.

The UE 410 further includes a plurality of phase shifters 416. Each of the plurality of the phase shifters 416 is configured to receive phase shifter control signal from the processor 404 and perform phase shifter 416 control instruction in the signal. In FIG. 4C, each antenna 410 corresponds a phase shifter. In other embodiment, the phase shifter 416 may correspond to one or more antenna 410.

The UE 410 further includes a plurality of amplifiers 414 that may comprise a power amplifier (PA) and a low noise amplifier (LNA) in the respective analog transmit and receive paths, respectively. The PA of amplifiers 414 amplifies outgoing RF signals for radiation from the antenna 410. The LNA of amplifiers 414 amplifies an ingoing RF signal received from the antenna 410. The amplifiers 414 may be configured to receive a gain control instruction from the processor 404 during transmission and reception of RF signals though such control signals are not shown here in FIG. 4C. While only one antenna 410 that corresponds the each of the amplifiers 414 is shown, the amplifiers 414 may be coupled to one or more antennas 410.

In addition, the UE 410 includes at least one memory which not shown in the FIG. 4C. The memory 406 is coupled to the processor 404 and stores instructions and data used, generated, or collected by the UE 410. For example, the memory could store software or firmware instructions executed by the processor(s) 404 and data used to reduce or eliminate interference in incoming signals. Each memory 406 includes any suitable volatile and/or non-volatile storage and retrieval device(s). The memory may be band on the processor 404 and/or the RF transceiver 412, the memory may also separate from the processor 404 and the RF transceiver 412.

Figure 4D:
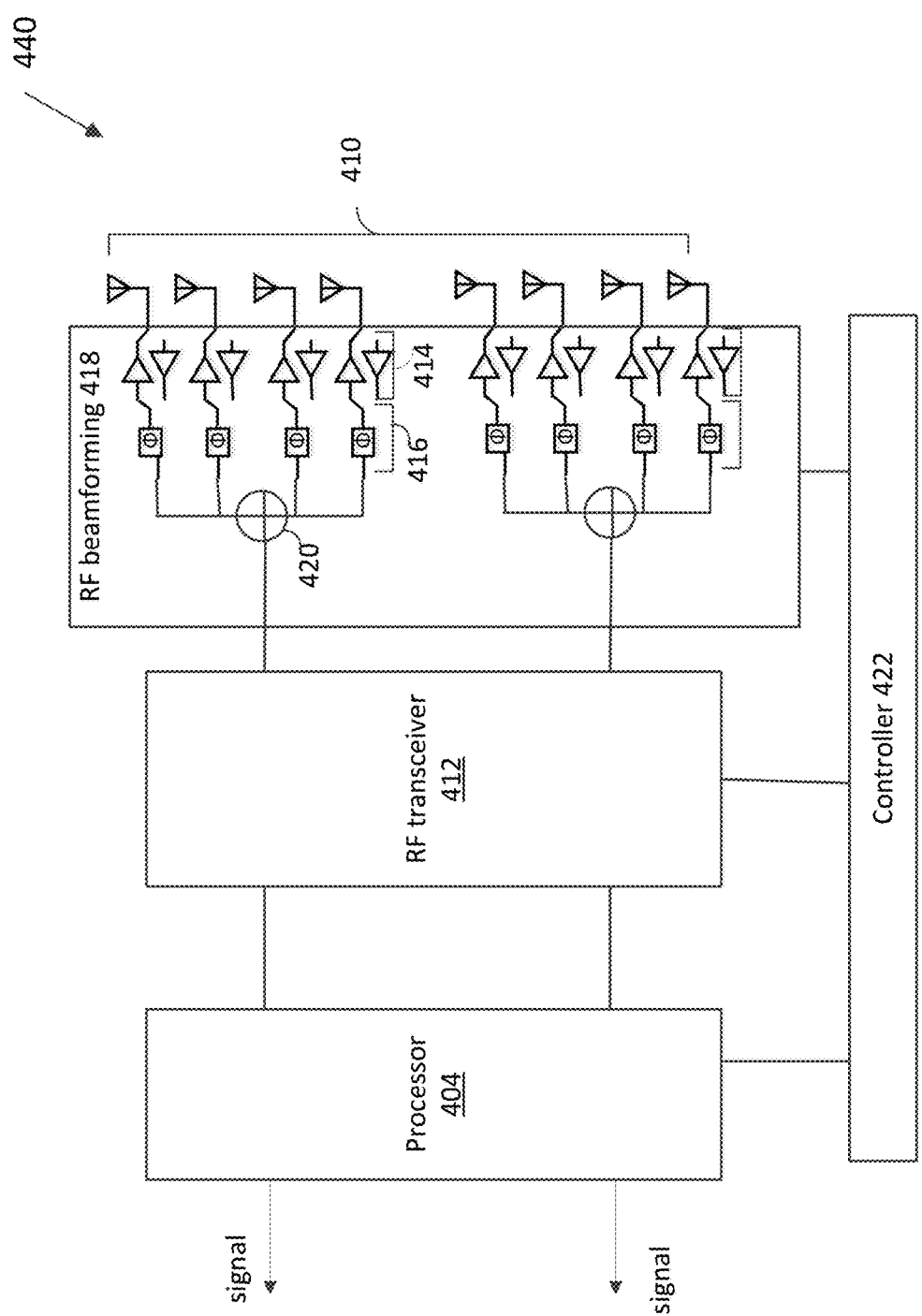
FIG. 4D illustrates an example of a receive path for baseband processing and analog beamforming with a large number of antennas, according to embodiments of the disclosure.

FIG. 4D illustrates a receive path for baseband processing and analog beamforming with a large number of antennas, according to embodiments of this disclosure. The receive path 440 includes a beam forming architecture in which all of the signals received at the RX antennas are processed through an amplifier 414 (e.g., a low noise amplifier (LNA)) and a phase shifter 416. The signals are then combined to form an analog stream that can be further converted to the baseband signal and processed in a baseband.

As shown in FIG. 4D, the antennas 410 (also refers the receive antenna) receive the signals transmitted by the transmit antennas of the base station over the air. Each receive antenna can have one or multiple antenna elements. The signals from the RX antennas are processed through the LNAs 414 and the phase shifters 416. The signals are combined at a combiner 420 to form an analog stream. In total, a plurality of analog streams can be formed. Each analog stream can be further converted to the baseband signal via an RF transceiver. The converted digital signals can be processed in processor which may be a baseband RX MIMO processing module 404 or other baseband processing, to obtain the recovered NS information streams. A controller 422 may interact with processor 404 including the baseband processor, RF transceiver 412, RX beam forming module 418, and RX antenna array 410. The controller may obtain the first communication signals comprise beam direction change information which sent by the base station, determine the second reception beam direction in accordance with the beam direction change information, and adjust the reception beam from the first reception beam direction to a second reception beam direction in accordance with the beam direction change information. For example, the controller 422 may adjust the RF transceiver 412, RF beamforming module or the RX antenna array to adjust the reception beam to the second reception beam direction. The controller may couple to a memory not shown and a processor not shown.

Figure 5B:
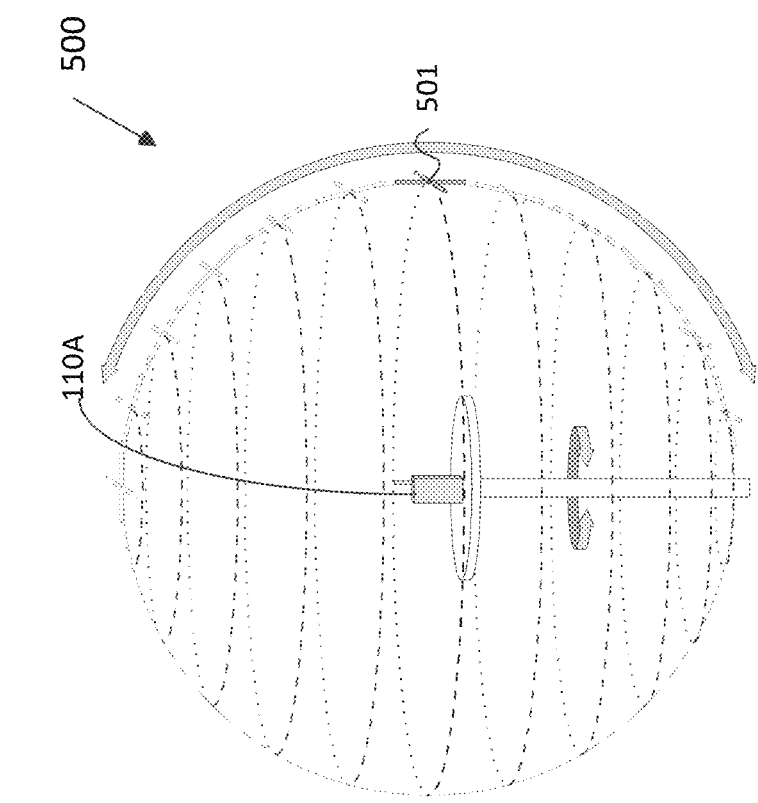
FIG. 5B illustrates an example of an OTA testing system that may implement the methods and teachings according to this disclosure.
Figure 5A:
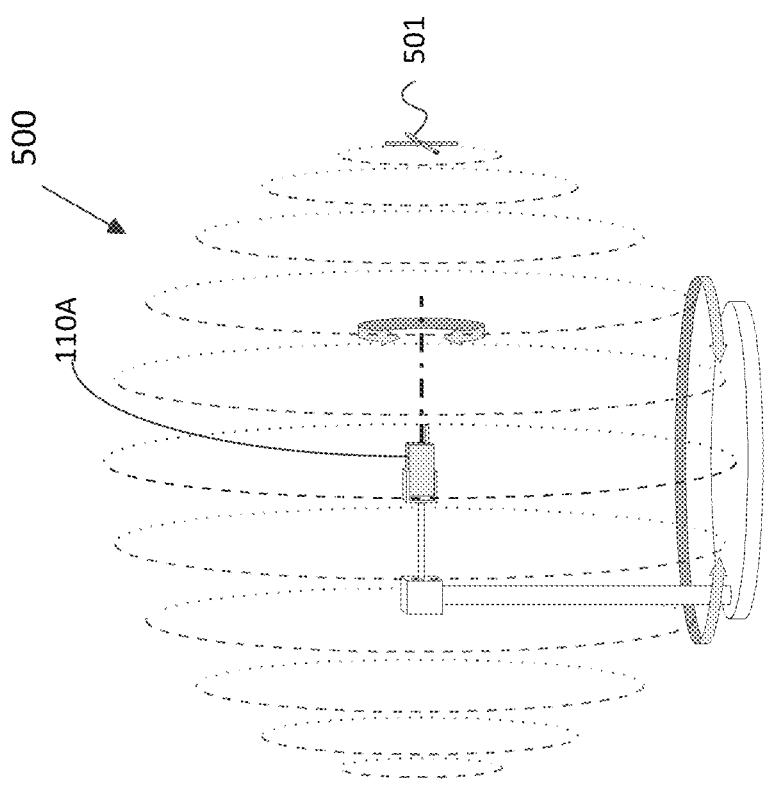
FIG. 5A illustrates an example of an OTA testing system that may implement the methods and teachings according to this disclosure.

FIG. 5A illustrates an example of an OTA testing system that may implement the methods and teachings according to this disclosure. In FIG. 5A, the system 500 includes a UE 110A, a base station antenna 501. The base station antenna 501 may be a measurement antenna, or a base station antenna in communication between the UE 110A and the base station 501. In FIG. 5A, The UE 110A rotates over azimuth and elevation angles, the base station antenna 501 is fixed. The sensor of the UE may detect relative motion between the UE 110A and the base station antenna 501. The sensor of the UE 110A may detect relative motion between the UE 110A and the transmission beam from the base station antenna 501.

FIG. 5B illustrates another example of an OTA testing system that may implement the methods and teachings according to this disclosure. In FIG. 5B, The UE 110A rotates over azimuth angles, the base station antenna 501 also rotates over elevation angles. The sensor of the UE may detect relative motion between the UE 110A and the base station antenna 501. Therefore, the sensor of the UE 110A may detect relative motion between the UE 110A and the transmission beam from the base station antenna 501.

Figure 5C:
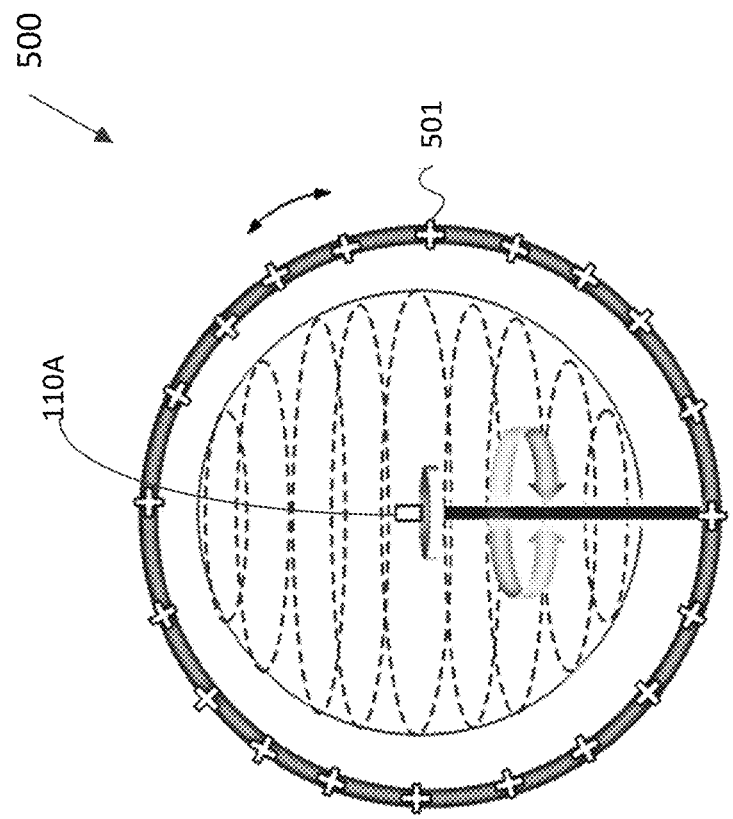
FIG. 5C illustrates an example of an OTA testing system that may implement the methods and teachings according to this disclosure.

FIG. 5C illustrates another example of an OTA testing system that may implement the methods and teachings according to this disclosure. Comparing to FIG. 5B, the system in FIG. 5C includes multiple antennas as designed spacing based on a testing policy. Therefore, switching the antennas may cover all elevation angles. In FIG. 5C, The UE 110A rotates over azimuth angles, the base station antenna 501 moves along a small elevation angle. The sensor of the UE 110A may detect relative motion for an azimuth angle change between the UE 110A and the base station antenna 501. Therefore, the sensor of the UE 110A may detect relative motion between the UE 110A and the transmission beam from the base station antenna 501.

Figure 5D:
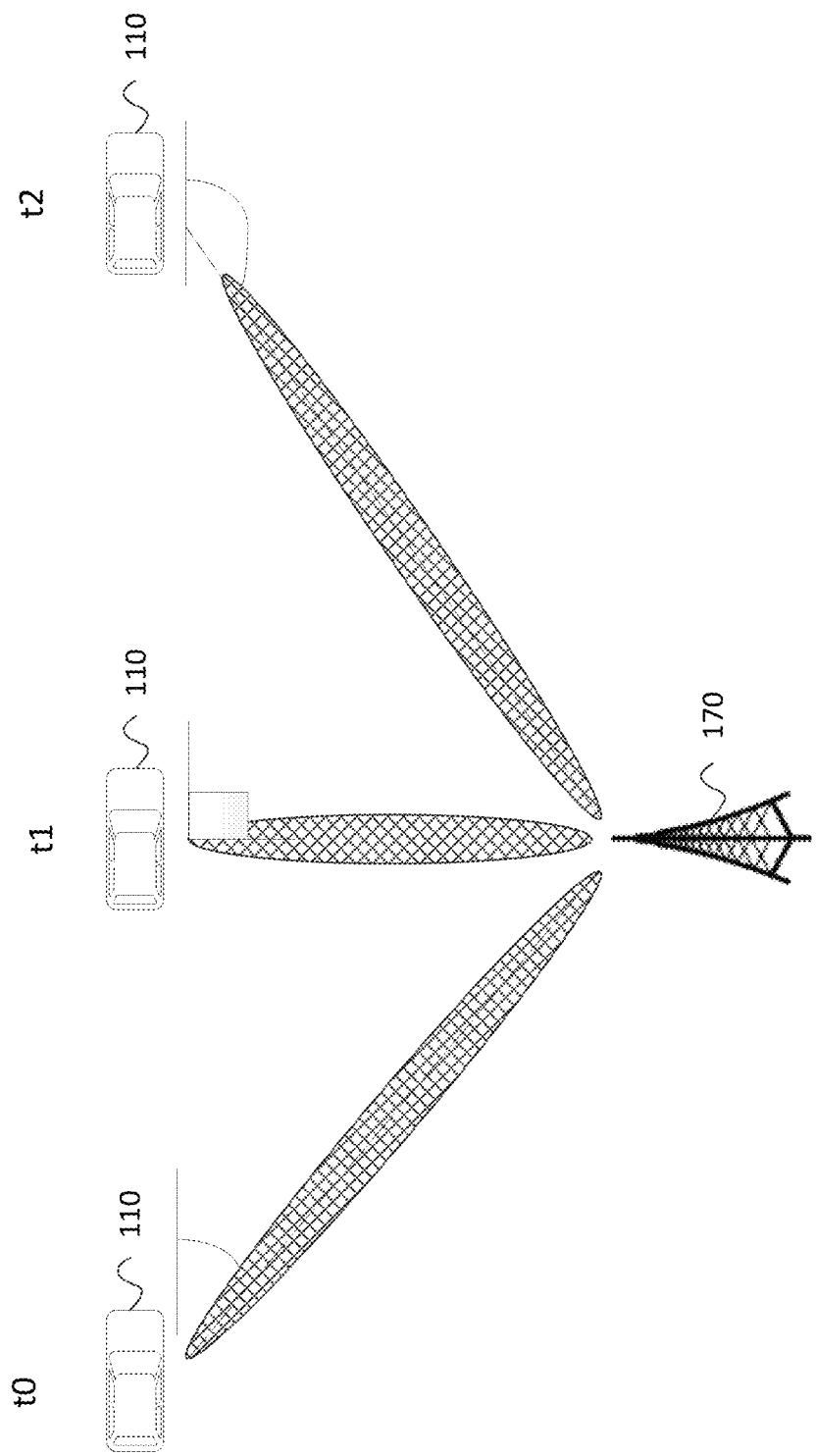
FIG. 5D illustrated an example in the live network that may implement the methods and teaching according to this disclosure.

FIG. 5D illustrated another embodiment in the live network that may implement the methods and teaching according to this disclosure. In this embodiment, the UE 110A is moving along a direction from t0 to t2, while the base station 170 tracks the UE movement and redirects the base station beam to follow up with UE's movement, without changing the base station beam ID. UE's motion sensor may provide speed information. In a coordinate fixed to the UE, the base station beam direction changes gradually. Base station may predict UE's new location with UE reported base station beam signal strength/quality over time over different base station beam. Base station may predict UE's new location with UE reported base station beam signal qualities over different base station beam and UE's speed information. UE's motion sensor may provide speed information. With the predicted UE new location, base station may determine a new base station beam to track the UE movement.

Figure 6A:
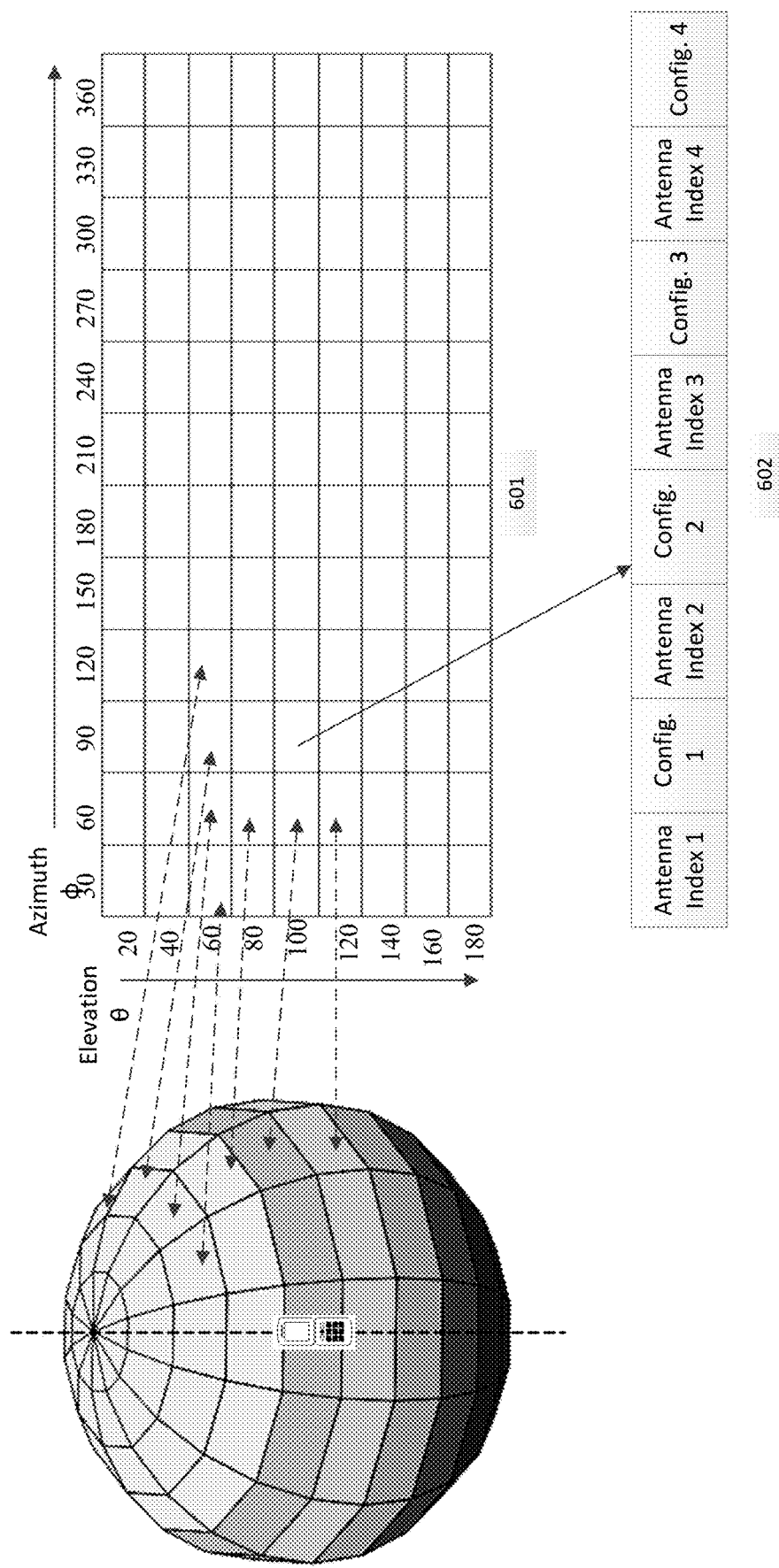
FIG. 6A illustrates an example of a mapping table that may be implemented by the methods and teachings according to this disclosure.

FIG. 6A illustrates an example of a mapping table that may be implemented by the methods and teachings according to this disclosure. The mapping table 601 comprises a mapping for each beam direction of the reception beam (also refers to the reception beam direction) in UE coordinate and reception beam parameters of reception beam. The beam direction relative the UE is the reception beam direction to the spherical of the UE. The reception beam direction are described by two-dimensional coordinates (as represented by the "squares") based on the elevation (θ) and the azimuth (φ). (Other spherical coordinate may apply as well). A phased array antenna system may be characterized by a table indexed by the elevation (θ) and azimuth (φ) angles, mapping to the quantized direction in a coordinate fixed to the UE 110. The elevation (θ) direction includes 180 degrees, the azimuth (φ) direction includes 360 degrees. As an example, each square in elevation (θ) direction may correspond to 20 degrees. Each square in azimuth (φ) direction may correspond to 30 degrees. In other situation, each square may correspond to different coverage in elevation (θ) direction or in azimuth (φ) direction.

Each reception beam direction (θ, φ) corresponds to a reception beam parameter. The reception beam parameter is used to configure component relate to an antenna (or antenna element of an antenna array) to receive signals from the base station to form a reception beam directed to the reception beam direction. The reception beam parameter includes an antenna index and component configuration, the reception beam parameter is used to configure the component corresponding to the antenna to form a reception beam having the reception beam direction. The component configuration may be the shifter configuration, amplifier configuration. When the reception beam is formed by an antenna array, the antenna index may be antenna array index, the component configuration may be configuration corresponding to the antenna elements of the antenna array. For each reception beam direction (θ, φ), each of the antenna (or the antenna elements in the antenna array) in the system is analyzed to find the optimum setting for each phase-shifter 416 (delay) and amplifier 414 (i.e., determine the best performing phased array antenna). In the case of the UE 110A having multiple antenna arrays, each antenna array can be identified with an antenna array index. For each reception beam direction, a UE antenna array with a corresponding phase shifter and amplifier gain setting are selected. In one embodiment, two phased array antenna configurations are selected, one for each polarization. The corresponding configurations are stored in the configuration table 602.

For example, for each reception beam direction, the configuration table 602 is configured with the reception beam parameter that includes the phased array configuration for each antenna element in the antenna array. In the example of FIG. 6A, the antenna array has four (4) antenna elements, such that the configuration table 602 includes four corresponding antenna indices (antenna index 1-antenna index 4) and a component configuration (phase array configuration 1-phased array configuration 4). It is appreciated however that any number of environments may exist. Multiple phased array antenna for each direction may be used in diversity operation, or in MIMO configuration to support more than one stream on either transmit or receive direction.

Additionally, for each reception beam direction, there is an optimal (or a list of optimal) antenna array configuration, the transmission beam direction can be identified by the optimum reception beam direction during the acquisition stage, as the UE 110A sweeps through possible receive beams for each transmit training beam sequence.

FIGS. 6B and 6C illustrate an example of a scenario in a UE fixed coordinate system. In the UE fixed coordinate system, the transmission beam direction is changed due to the rotation (angular movement) of the UE, according to this disclosure. In this example, the transmission beam is fixed, the angular movement (rotation) of the transmission beam from the base station is equivalent to an angular movement (rotation) of UE. In the UE fixed coordinate system, the UE does not differentiate the direction change of the reception beam of the UE because of the direction change or because of UE rotation.

If transmission beam direction does not change in earth fixed coordinate system, the UE may adjust the UE beam (also refers to the reception beam) and align the reception beam to the transmission beam direction, by compensating the UE movement with the rotational information from motions sensors including gyroscope and accelerometer. In the case when transmission beam direction changes, UE cannot use its rotational information to predict a beam direction in the UE fixed coordinate system. It is necessary to obtain beam direction change information through the signal from the base station.

Figure 6D:
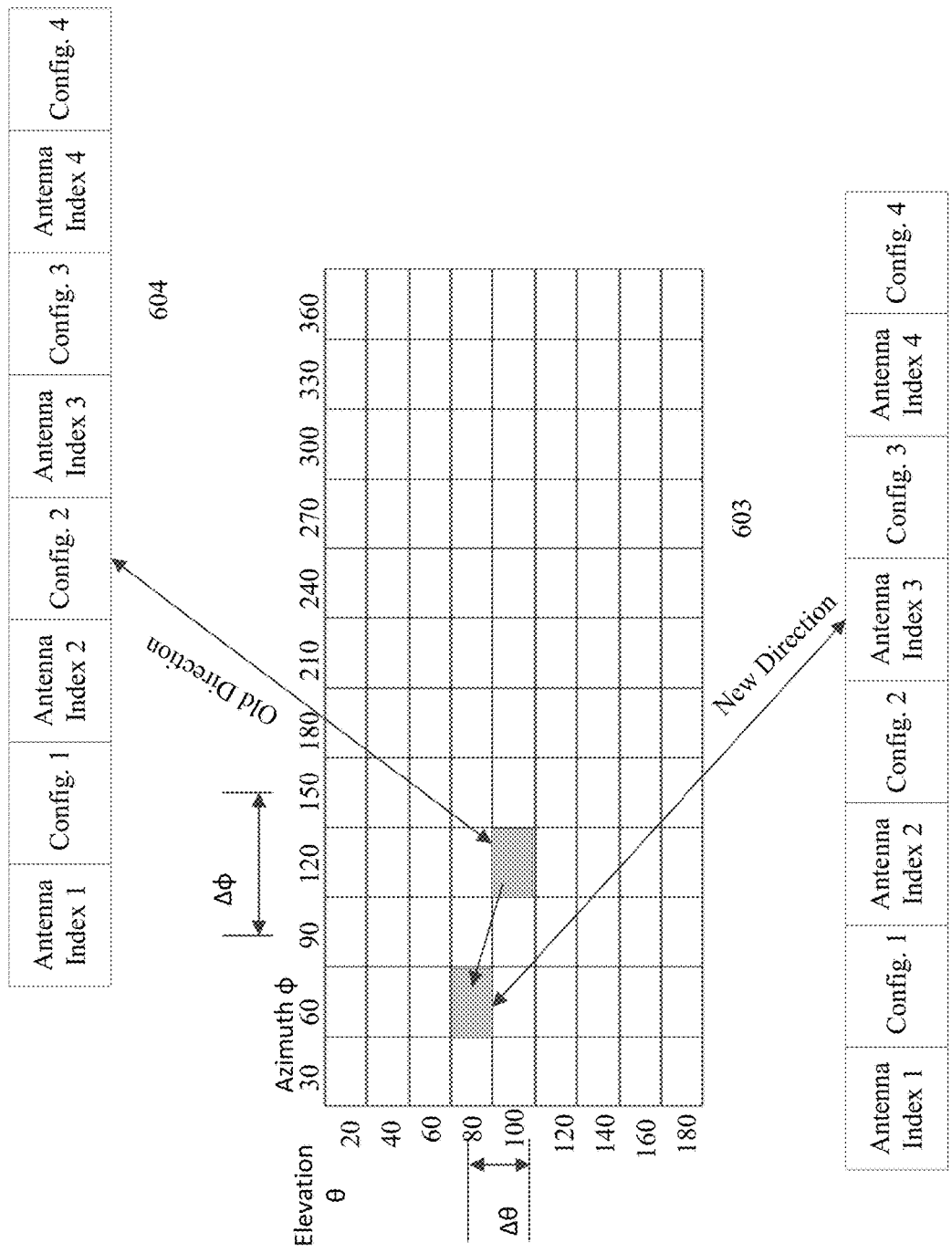
FIG. 6D illustrates an example in which the base station beam is tracked and optimized.

FIG. 6D illustrates an example in which the transmission beam of the base station is tracked and optimized. As depicted, an situation 603 is shown with an old (original, prior, or a first) reception beam direction and a new reception beam direction (after a change in UE orientation, also refers to a second reception beam direction) and corresponding configuration tables 604 and 605. In particular, during the tracking state, the current reception beam parameter (antenna array index, antenna array configuration) are correlated with reception beams as determined during the beam search and alignment procedure. The current reception beam parameter may be referred to the first reception beam parameter. The UE predicts the orientation of the reception beam (the reception beam direction) in a UE fixed coordinate system based on a change in the UE orientation change ($\Delta\theta$, $\Delta\varphi$). The UE orientation change is derived using the information from gyroscope and accelerometer attached to UE. Based on the detected change in the UE orientation, the antenna switch state (which antenna array should be used/selected) and phased shifter configuration may be determined based on the reception beam parameters in the configuration tables 604 and 605. UE's rotation requires three independent variables. In a UE fixed coordinate system, UE rotation may not be perceived as the beam direction change of the transmission beam, but as the base station beam polarization change. In one embodiment, if the polarization directional angle changes such that it exceeds a limit/threshold, the antenna and component configuration may be changed from one polarization to another polarization. In another embodiment, the configuration tables 604 and 605 may be updated to reflect the scenario change, such as the antenna is changed, and so on. In the UE fixed coordinate system, the UE cannot differentiate the direction change of the reception beam is due to UE rotation or base station beam change or both. The base station is expected to inform the UE when there is a direction change for the same beam ID, or a polarization change.

Following is an example implementation of beam acquisition and tracking discussed with reference to the various Figures. The implementation described below is not intended to be limited and is merely one example of implementation for purposes of discussion.

As noted above, beam acquisition establishes the initial beam configuration between corresponding devices (e.g., the base station 170 and the UE 110), enabling the devices to initiate communications, such as an mmWave band communication. After the base station 170 and the UE 110A have established communication over the beam pair link (the transmission beam of the base station and the reception beam of the UE, and the reception beam of the base station and the transmission beam of the UE), the UE 110A may use information provided by the sensors to determine the particular environment in which the UE 110A is operating.

During the beam searching procedure, a sequence of training beams are sent to the UE 110A from the base station 170. Each of the training beams is configured to a specific direction and is received by the UE 110. In one embodiment, the UE antenna pattern is configured to be omni-directional. In another embodiment, if the UE 110A has multiple phased array antennas, only the antennas listed in the configuration table (for the specific environment) will be configured for the corresponding direction. The UE 110A will use all available UE beams (covering all intended directions) to receive the training beams (also referred to base station beams, or the transmission beam of the base station) and report the received training beams ID or the beams having the strongest signal back to the base station 170. For example, if the base station 170 is configured to sixteen different directions (base station beams) and the UE 110A has six available UE beams from phased array antennas. There will be ninety-six training beams-reception beams pairs (16 BS beams×6 UE beams, where UE will search through each of 16 training beams using all of its available UE beams (6 UE beams). Upon receipt of the training beams (the base station beams), the UE 110A will report the training beam having the best quality (strongest signal typically), or a few beams with the higher signal quality. In this example, and for purposes of discussion, the UE 110A reports the training beam 2 as having the best quality. After the UE 110A reports the best quality beam or the few beams with higher signal quality back to the base station 170, the base station 170 may begin to transmit using the best quality transmission beam when sending signals to UE 110, and the UE 110A may begin to receive using the corresponding UE beam or do beam fine alignment.

In one embodiment, additional alignment between the base station 170 and UE 110A may be implemented by fine tuning the base station beam direction. The base station 170 will signal to the UE 110A the intended base station fine beam search. The base station will transmit using the finer/ narrower beams in the proximity of the UE reported best base station beam direction. The UE 110A will fix the UE beam to the best UE beam from the previous beam search result. The UE 110A will report the best base station beam with the fixed UE beam.

During the beam searching/alignment procedure, UE 110A may configure an omni-directional array, or use a list of beams from the configuration table. The configuration table used in beam searching/alignment could be the same as the table used in tracking state. The configuration table used in the beam searching/alignment could be different, covering all directions with a coarse resolution in ($\theta$, $\varphi$) space, or covering a limited direction because some phased antenna array is deemed unusable in that environment. After completion of initial alignment, the UE 110A may start a UE fine beam search. The UE 110A may load the configuration table corresponding to tracking state, as shown in FIGS. 6A to 6D. In one embodiment, as the base station 170 is now transmitting using the reported best transmission beam, the UE 110A will search through the determined configuration table for all possible directions ($\theta$, $\varphi$) when an omni-directional pattern is used in the initial beam searching/alignment stage. In another embodiment, where UE 110A uses a list of the available UE beam in the searching/alignment state, while the base station 170 is transmitting using the reported beam, UE 110A will search through the neighborhood of the receive beam ($\theta 0$, $\varphi 0$).

The UE 110A may then complete the fine alignment procedure by configuring the phased array antennas to the determined best direction with the best UE beam as defined in the configuration table. For example, if the UE 110A achieves the highest signal quality in the (45, 90) direction with antenna #2, the UE 110A will select antenna 2 and configure it to use the predetermined phased array configuration as indicated in the configuration table.

After beam searching and refinement has been implemented, the UE 110A begins beam tracking to track the transmission beam of the base station. As discussed above, beam tracking refers to updating the beam configuration between the UE 110A and the base station 170 to keep the best beam alignment. The beam tracking depends on the radio channel condition between the base station 170 and UE 110, the relative motion and orientation of UE 110. If the channel coherent time (during which the channel is assumed to be static and the reception beam direction remains the same) is long enough, the motion/orientation information will be used to maintain the tracking state. The channel coherent time determines how frequently motion/orientation information should be provided. The channel coherent time could be derived by the speed of UE 110, which could be estimated for example by a GPS sensor. Based on the previously implemented procedures, the UE 110A is aware of the phased array antenna configuration and the reception beam direction. For example, and following the above example, the UE 110A is aware that the strongest signal is coming from the direction (45, 90).

When the base station beam (also the transmission beam of the base station in the disclosure) changes orientation (e.g., rotate, strong winds have moved an antenna system into other directions), the base station 170 sends the beam direction change information of the transmission beam to the UE 110. The UE 110A may determine the change of orientation ($\Delta\theta$, $\Delta\varphi$) relative to the UE 110A based on beam direction change information of the transmission beam. The beam direction change information may be angle change information of the transmission beam, or angle change information of the reception beam. The angle change information of the reception beam may be determined by the base station based on the angle change information of the transmission beam and the distance between the base station and the UE. If the beam direction change information notified by the base station is the angle change information of the transmission beam, the angle change information of the reception beam may be determined by the base station based on the angle change information of the transmission beam and the distance between the base station and the UE. In other example, the beam direction change information may be information of a transmission beam direction, or a second reception beam direction. If the beam direction change information notified by the base station is the transmission beam direction, the second reception beam direction may be determined by the base station based on the transmission beam direction and the distance between the base station and the UE.

For example, based on the first reception beam direction ($\theta$, $\varphi$) and the beam direction change information ($\Delta\theta$, $\Delta\varphi$) of the transmission beam, the UE 110A can calculate a second reception beam direction as ($\theta-\Delta\theta$, $\varphi-\Delta\varphi$). The first reception beam direction is the orientation of the reception beam before the UE receives the beam direction change information. For example, if the transmission beam rotates (30, 0) in an earth-fixed coordinate system, the orientation change information ($\Delta\theta$, $\Delta\varphi$) is (30, 0) which is the beam change information of the transmission beam. The first reception beam direction (45, 90) will be change to the second reception beam direction (15, 90) ((45-30), (90-0)= (15, 90)) in the coordinate system fixed to the base station 170. If UE does not rotate, the UE aligns the UE-fixed coordinate with earth-fixed coordinate and the UE 110A may then use the reception beam parameter corresponding to the second reception beam direction ($\theta-\Delta\theta$, $\varphi-\Delta\varphi$) to configure the component. In other example, if the UE also rotates (-30, 0) in an earth-fixed coordinate system, the beam direction change ($\Delta\theta$, $\Delta\varphi$) information is the base station beam change information combined with the UE movement information (-30+30) (0+0), the (45, 90) direction in the UE's 110 coordinate system will still be (45, 90) direction (45-30+30), (90-0+0)). The UE 110A may then use the reception beam parameter corresponding to the second beam direction ($\theta-\Delta\theta$, $\varphi-\Delta\varphi$) to configure the component.

In other example, if the transmission beam rotates (30, 0) in an earth-fixed coordinate system, the orientation change information ($\Delta\theta$, $\Delta\varphi$) is (30, 0) which is the beam direction change information of the reception beam. The first reception beam direction (45, 90) will be change to the second reception beam direction (15, 90) ((45+30), (90+0)=(135, 90)) in the coordinate system fixed to the base station 170. If UE does not rotate, the UE aligns the UE-fixed coordinate with earth-fixed coordinate and the UE 110 may then use the second beam direction ($\theta+\Delta\theta$, $\varphi+\Delta\varphi$) to configure the antenna of the UE.

In one embodiment, configuring the component involves antenna switching. In another embodiment, the UE's orientation change is within the plane perpendicular to the base station beam direction. For this case, the same index ($\theta$, $\varphi$) to the configuration table will appear, while a phased array configuration for different polarization could be used if the changes of orientation are beyond a threshold.

Figure 7A:
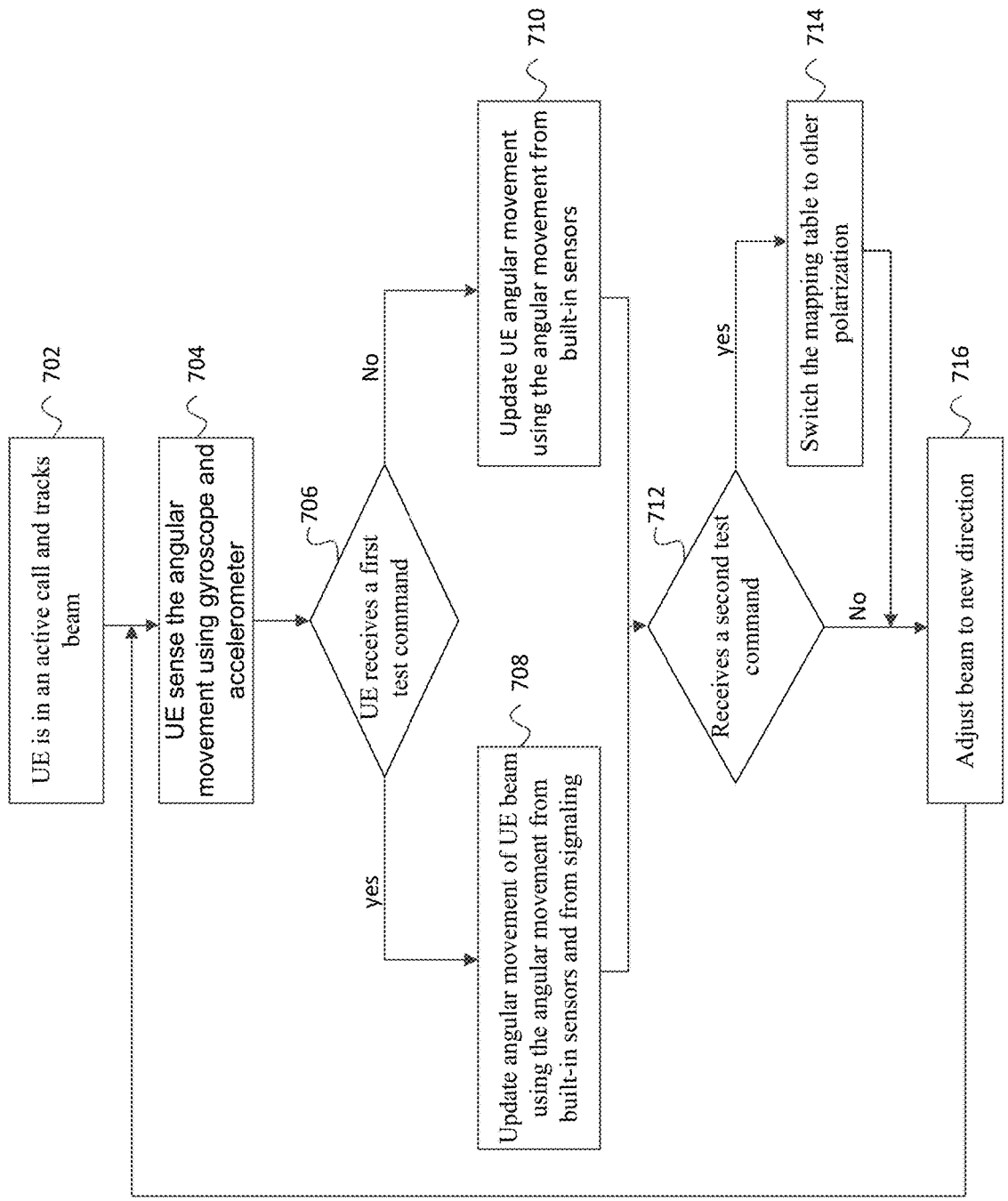
FIG. 7A illustrates an example in which the UE beam is adjusted and optimized based on the base station beam's angular movement.
Figure 7B:
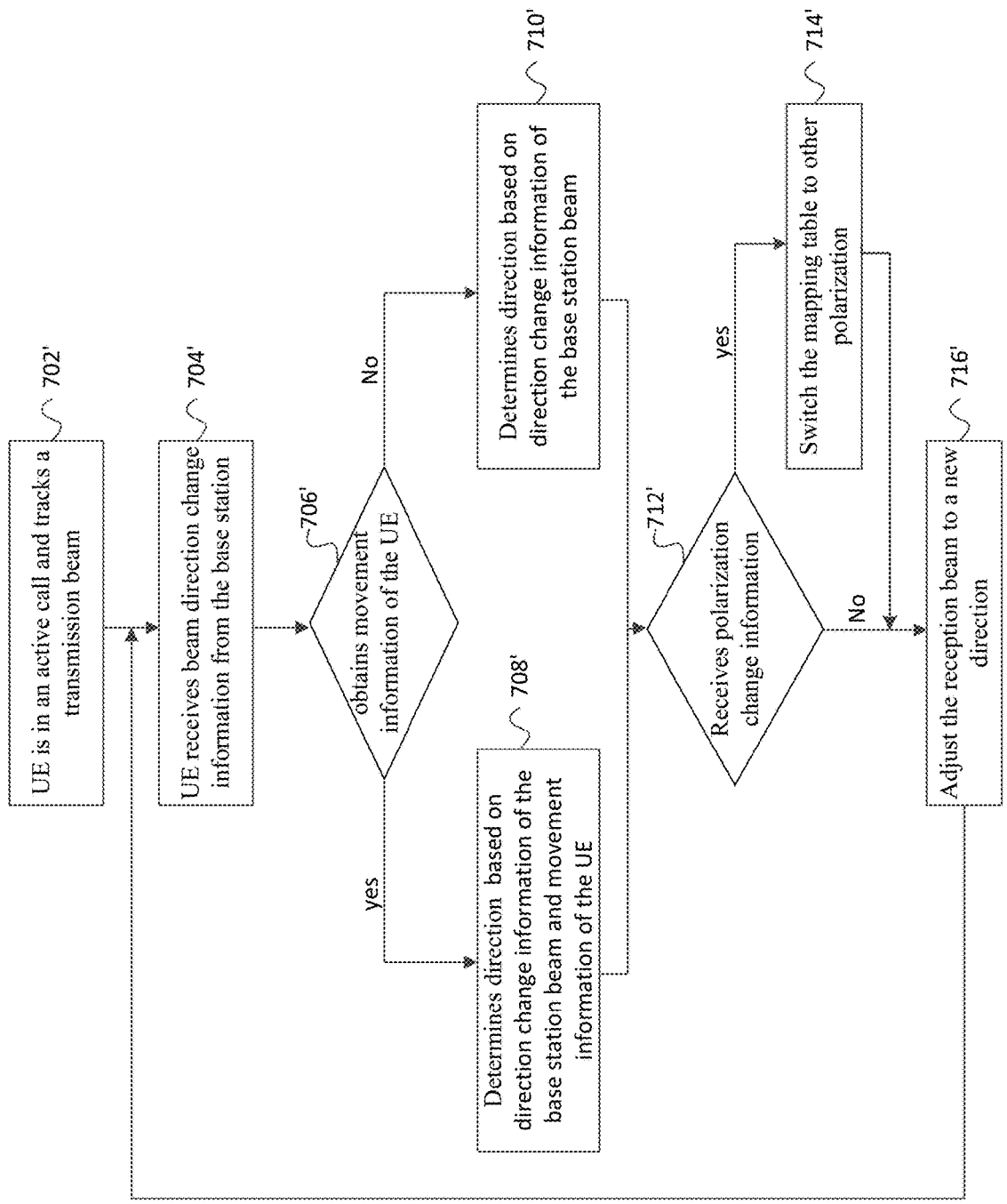
FIG. 7B illustrates an example in which the UE beam is adjusted and optimized based on the base station beam's angular movement.

FIGS. 7A-7B illustrate flow diagrams of beam steering according to various aspects of the disclosed embodiments. In the discussion that follows, the procedures disclosed are implemented by the user equipment. However, it is appreciated that implementation is not limited to the user equipment and that any system and/or component described with reference to FIGS. 1-3, 4A-4C, 5A-5D, 6A-6D and FIG. 9 may be employed to implement that procedures.

With reference to FIG. 7A, the user equipment (e.g., UE 110) will initially configure the component corresponding to the antenna or antenna element of the phased array using the reception beam parameter of the reception beam. To expedite the searching/alignment procedure, the reception beam could be omni-directional or only covering limited directions or with a limited number of antennas. The UE 110A will perform beam search through a list of available reception beams and determine the best reception beam direction of the reception beam to communicate with the base station 170. In other examples, the UE 110A may use other solutions, such as consulting with the base station 107, protocol agreement and so on to determine the best reception beam direction of the reception beam. During the communication of between the UE 110A and the base station 107, the UE may determine the current reception beam direction of the reception beam as the first reception beam direction. The UE 110A configures component corresponding to one or more antennas to form the reception beam in the reception beam direction determined based on a configuration from a mapping table.

At 702, the UE 110A is in an active state call and tracks a transmission beam to communicate with the base station 170. The UE 110A receives communication signals from the base station 170 based on the reception beam. The reception beam of the UE has a first reception beam direction.

The first reception beam direction aligns or nearly aligns to the transmission beam direction.

The first antenna of the UE may a single antenna of the UE, or may be a plurality of antenna elements of an antenna array of the UE.

At 704, the UE 110A senses its own movement using a gyroscope and accelerometer of the UE 110A. The UE 110A may identifies a beam direction change relative to the UE in response to the angular movement of the UE. The beam direction change relative to the UE may be angle change information of the reception beam. The beam direction change relative to the UE is determined, by estimating angular change from a prior established angular direction and determining an appropriate table entry defining reception beam parameters.

At 706, the UE 110A determines whether it has received a first communication signal (a test command) from the base station based on the reception beam of the UE. The first communication signal 170 includes beam direction change information. If the UE 110A receives the first communication signal from the base station 170, the UE 110A performs 708 to update angular movement of UE beam using the angular movement from built-in sensors and from signaling. If the UE 110A does not receive the first communication signal from the base station, the UE 110A performs 710 to update UE angular movement using the angular movement from built-in sensors.

The first communication signal comprises beam direction change information. The beam direction change information may be angle change information of a transmission beam, or angle change information of the reception beam. The beam direction change information may also be information of a transmission beam direction, or information of the second reception beam direction.

At 708, the UE 110A determines a second reception beam direction in a UE-fixed coordinate using the angular movement from sensors and the direction change information in the first communication signal.

After determining the UE 110 receives the first communication signal, the UE 110 combines the angular movement of the UE 110 and beam direction change information, determines beam change information of the reception beam in a UE-fixed coordinate system based on the angular movement of the UE 110 and the direction change information. The UE 110 determines the second reception beam direction based on the beam change information of the reception beam in a UE-fixed coordinate system. The second reception beam direction is based on the first reception beam direction and the change in the direction of the first UE beam, in a UE-fixed coordinate system, as described above and illustrated.

If the beam direction change information is information of a second transmission beam direction, or information a second reception beam direction, the UE determines the second reception directions based on information the a second transmission beam direction, or the information of the second reception beam direction.

At 710, the UE 110A updates UE angular movement using the movement from sensors.

After determining the UE 110A does not receive the first communication signal comprising the beam direction change information, the UE 110A determines the reception beam direction information based on the angular movement of the UE 110.

After determining the UE 110A does not receives the first communication signal comprising the beam direction change information, the UE 110A determines angle change information of the reception beam based on the angular movement of the UE 110A in UE-fixed coordinate system. The UE 170 determines the second reception beam direction based on the change in the direction of the first UE beam in a UE-fixed coordinate system.

At 712, the UE 110A determines whether receives a second test command which includes polarization change information from the base station 170. If the UE 110A receives the polarization change information from the base station 170, the UE 110A performs 714 and 716. If the UE 110A does not receive the polarization change information of the transmission beam from the base station, the UE 110A performs 716. The polarization change information may be the polarization change information of the transmission beam, or the polarization change information of the reception beam.

At 714, the UE 110A switches the mapping table to other polarization based on the second beam direction relative to the UE 110, or the UE switches the entries, corresponding to the polarization, of the mapping table.

At 716, the UE 110A adjusts the reception beam to a second reception beam direction and/or polarization, and receives second communication signals from the base station based on the reception beam having the second reception beam direction.

Upon identifying a change in the direction of the transmission beam, a second reception beam direction is determined by the UE 110. The second reception beam direction is based on the first reception beam direction and the beam change information of the reception beam, as described above and illustrated. The UE 110 may adjust the reception beam of the UE to the second reception beam direction. For example, the UE may reconfigure or switch the component (such as the shifter, the amplifier) corresponding to the antenna array of the UE, or existing phase setting for phase shifters may be varied according to a match in polarization. Or the UE may adjust a phase shifter or an amplifier based on the second reception beam parameter corresponding to the second reception beam direction.

After the UE 110A determines the second reception beam direction, the UE 110A configures the component corresponding to the antenna array by steering the first (prior) reception beam direction to the second reception beam direction to align the reception beam of the UE to the transmission beam of the base station. The UE 110A determines using the mapping table, the reception beam parameter corresponding to the second reception beam direction; In one embodiment, the UE adjusts the component corresponding to the antenna array by using the reception beam parameter corresponding to the second reception beam direction. The adjusting includes switching from one of the antenna array to another antenna.

With reference to FIG. 7B, the user equipment (e.g., UE 110) will initially configure the component corresponding to the antenna or antenna element of the phased array using the reception beam parameter of the reception beam. To expedite the searching/alignment procedure, the reception beam could be omni-directional or only covering limited directions or with a limited number of antennas. The UE 110A will perform beam search through a list of available reception beams and determine the best reception beam direction of the reception beam to communicate with the base station 170. In other examples, the UE 110A may use other solutions, such as consulting with the base station 107, protocol agreement and so on to determine the best reception beam direction of the reception beam. During the communication of between the UE 110A and the base station 107, the UE may determine the current reception beam direction of the reception beam as the first reception beam direction. The UE 110A configures component corresponding to one or more antennas to form the reception beam in the reception beam direction determined based on a configuration from a mapping table.

At 702', the UE 110A is in an active state call and tracks a transmission beam to communicate with the base station 170. The UE 110A receives communication signals from the base station 170 based on the reception beam. The reception beam of the UE has a first reception beam direction.

The first reception beam direction aligns or nearly aligns to the transmission beam direction.

At 704', the UE 110A receives first communication signal from the base station based the reception beam of the UE. With the reception beam having the first reception beam direction. The first communication signal 170 includes beam direction change information. The beam direction change may be angle change information of the reception beam. The beam direction change is determined, by estimating angular change from a prior established angular direction and determining an appropriate table entry defining reception beam parameters.

At 706', the UE 110A determines whether to obtain movement information of the UE 110. If the UE 110A obtains the movement information of the UE 110, the UE 110A performs 708', if the UE 110A does not obtain the movement information of the UE 110, the UE 110A performs 710'.

The movement information of the UE 110A may be an angular movement information of the UE 110. The UE 110A may sense the angular movement of the UE 110A by using a gyroscope and accelerometer of the UE 110.

The UE 110A may identify a change in direction of the first UE beam in response to the angular movement of the UE 110. The change in direction is determined, for example, based on the sensor(s) in the UE 110. The UE may also identifies a change in direction of the UE beam in response to the beam direction change information from the base station 170. The UE 110A may also identifies a beam direction change directed by the reception beam in response to the base station beam change information and the angular movement of the UE 110.

At 708', the UE 110A determines direction of the reception beam in a UE-fixed coordinate using the angular movement from sensors and the beam direction change information in the first communication signal.

After determining the UE 110 receives the first communication signal, the UE 110 combines the angular movement of the UE 110 and beam direction change information, determines beam change information of the reception beam in a UE-fixed coordinate system based on the angular movement of the UE 110 and the direction change information. The UE 110 determines the second reception beam direction based on the beam change information of the reception beam in a UE-fixed coordinate system. The second reception beam direction is based on the first reception beam direction and the change in the direction of the first UE beam, in a UE-fixed coordinate system, as described above and illustrated.

If the beam direction change information comprises information of a second transmission beam direction, or a second reception beam direction, the UE determines the second UE directions based on the a second transmission beam direction, or a second reception beam direction.

At 710', the UE 110A determines second reception beam direction based on the beam direction change information from the base station 170.

After determining the UE 110A does not receive the first communication signal comprising the beam direction change information, the UE 110A determines the reception beam direction information based on the angular movement of the UE 110.

After determining the UE 110A does not receives the first communication signal comprising the beam direction change information, the UE 110A determines angle change information of the reception beam based on the angular movement of the UE 110A in UE-fixed coordinate system. The UE 170 determines the second reception beam direction based on the change in the direction of the first UE beam in a UE-fixed coordinate system.

At 712', the UE 110A determines whether receives polarization change information from the base station 170. If the UE 110A receives the polarization change information from the base station 170, the UE 110A performs 714' and 716'. If the UE 110A does not receive the polarization change information of the transmission beam from the base station, the UE 110A performs 716'. The polarization change information may be the polarization change information of the transmission beam, or the polarization change information of the reception beam.

At 714', the UE 110A switches the mapping table to other polarization based on the second beam direction relative to the UE 110, or the UE switches the entries, corresponding to the polarization, of the mapping table.

At 716', the UE 110A adjusts the reception beam to a second reception beam direction and/or polarization, and receives second communication signals from the base station based on the reception beam having the second reception beam direction.

Upon identifying a change in the direction of the transmission beam, a second reception beam direction is determined by the UE 110. The second reception beam direction is based on the first reception beam direction and the beam change information of the reception beam, as described above and illustrated. The UE 110 may adjust the reception beam of the UE to the second reception beam direction. For example, the UE may reconfigure or switch the component (such as the shifter, the amplifier) corresponding to the antenna array of the UE, or existing phase setting for phase shifters may be varied according to a match in polarization. Or the UE may adjust a phase shifter or an amplifier based on the second reception beam parameter corresponding to the second reception beam direction.

After the UE 110A determines the second reception beam direction, the UE 110A configures the component corresponding to the antenna array by steering the first (prior) reception beam direction to the second reception beam direction to align the reception beam of the UE to the transmission beam of the base station. The UE 110A determines using the mapping table, the reception beam parameter corresponding to the second reception beam direction; In one embodiment, the UE adjusts the component corresponding to the antenna array by using the reception beam parameter corresponding to the second reception beam direction. The adjusting includes switching from one of the antenna array to another antenna.

Figure 8:
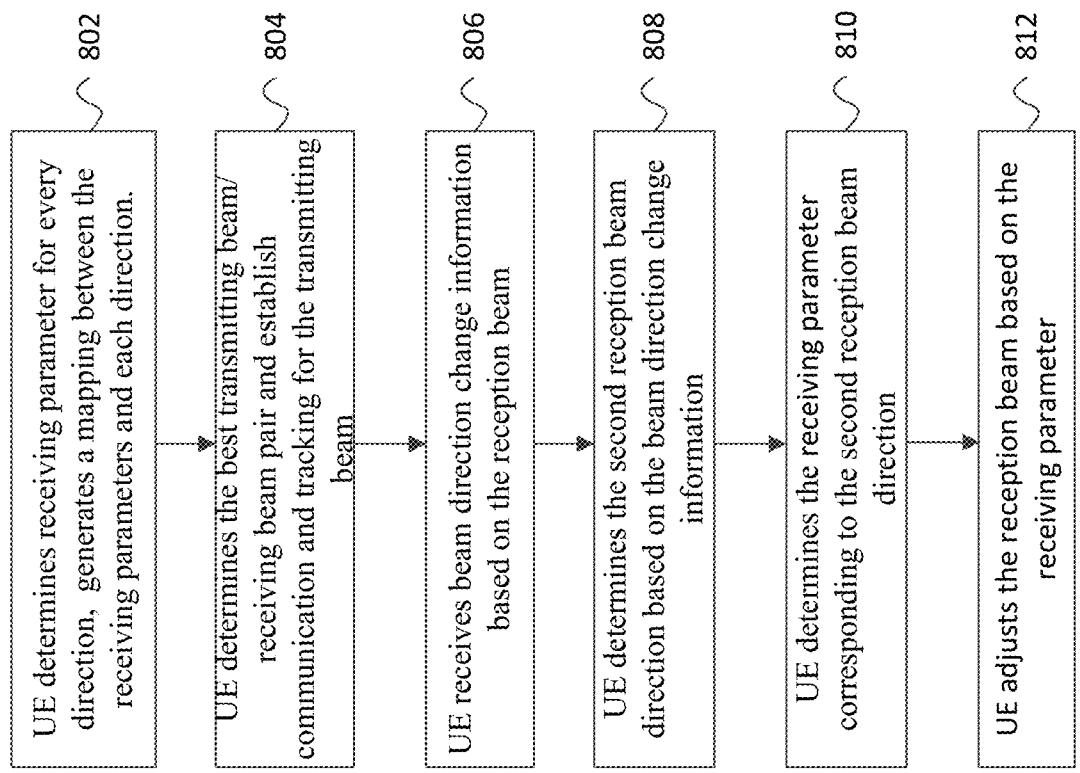
FIG. 8 illustrates an example in which the UE beam is adjusted and optimized based on the base station beam's angular movement.

FIG. 8 illustrate flow diagrams of beam steering according to various aspects of the disclosed embodiments. In the discussion that follows, the procedures disclosed are implemented by the user equipment. However, it is appreciated that implementation is not limited to the user equipment and that any system and/or component described with reference to FIGS. 1-3, 4A-4C, 5A-5D, 6A-6D and FIG. 10 may be employed to implement that procedures.

At 802, the UE 110A determines the reception beam parameters of the reception beam for a plurality of reception beam directions. The plurality of reception beam directions comprises the first reception beam direction and the second reception beam direction. The reception beam parameters of the reception beam comprises the first reception beam parameter and the second reception beam parameter. The UE 110A searches through available configurations for phase shift and gain, and obtain an optimum reception beam parameters for each reception direction. The UE 110A generates a mapping relationship between each reception beam direction and a corresponding reception beam parameter of the reception beam parameters. The mapping table may be referred to FIG. 6.

At 804, the UE determines the best transmission beam/reception beam pair to determine a first reception beam direction of a reception beam, and establishes communication with the base station based on the reception beam and tracks the transmission beam of the base station.

The UE may perform beam searching to determine the first reception beam direction of a reception beam. The UE may use other solutions to determine the first reception beam direction of a reception beam, such as consulting with the base station 107, protocol agreement and so on to determine the best reception beam direction of the reception beam. During the communication of between the UE 110A and the base station 107, the UE may determine the current reception beam direction of the reception beam as the first reception beam direction.

At 806, the UE 110A receives first communication signals from the base station 170 based on the reception beam having the first reception beam direction, with the first communication signal comprising beam direction change information.

The first communication signal includes beam direction change information. The direction change information of the transmission beam comprises angular movement information of the transmission beam. Such as the rotate angle information of the transmission beam.

At 808, UE determines a second reception beam direction based on the direction change information.

At 810, the UE 110A determines second reception beam parameter corresponding to the second reception beam direction.

At 812, the UE adjust the reception beam based on the second reception beam parameters to steer the reception beam to the second receiving beam direction.

Figure 9:
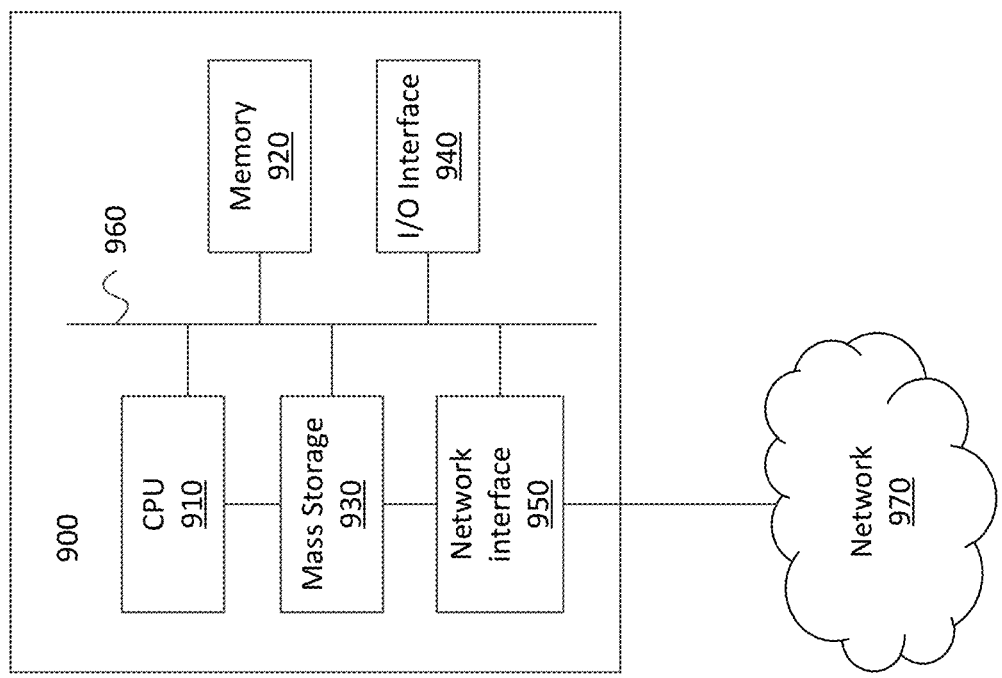
FIG. 9 illustrates a block diagram of a network system that can be used to implement various embodiments.

FIG. 9 is a block diagram of a network device that can be used to implement various embodiments. Specific network devices may utilize all of the components shown, or only a subset of the components, and levels of integration may vary from device to device. Furthermore, the network device 900 may contain multiple instances of a component, such as multiple processing units, processors, memories, transmitters, receivers, etc. The network device 900 may comprise a processing unit equipped with one or more input/output devices, such as network interfaces, storage interfaces, and the like. The network device 900 may include a central processing unit (CPU) 910, a memory 920, a mass storage device 930, and an I/O interface 940 connected to a bus 960. The bus 960 may be one or more of any type of several bus architectures including a memory bus or memory controller, a peripheral bus or the like.

The central processing unit (CPU) 910, the memory 920, the mass storage device 930, and the I/O interface 940 connected each other via the bus. Or the central processing unit (CPU) 910, the memory 920, the mass storage device 930, and the I/O interface 940 connected each other directly.

The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs. In embodiments, the memory 920 is non-transitory. The mass storage device 930 may comprise any type of storage device configured to store data, programs, and other information and to make the data, programs, and other information accessible via the bus 960. The mass storage device 930 may comprise, for example, one or more of a solid state drive, hard disk drive, a magnetic disk drive, an optical disk drive, or the like.

The device 900 also includes one or more network interfaces 950, which may comprise wired links, such as an Ethernet cable or the like, and/or wireless links to access nodes or one or more networks 970. The network interface 950 allows the processing unit 1001 to communicate with remote units via the networks 970. For example, the network interface 950 may provide wireless communication via one or more transmitters/transmit antennas and one or more receivers/receive antennas. In an embodiment, the device is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Further examples of the disclosure are listed below though the claims should not be limited to merely what has been illustrated.

Example 1

A method performed by a user equipment (UE), comprising:
receiving first communication signals from a base station using the reception beam having a first reception beam direction, wherein the first communication signals comprise beam direction change information;
adjusting the reception beam from the first reception beam direction to a second reception beam direction in accordance with the beam direction change information; and
receiving second communication signals from the base station based on the reception beam having the second reception beam direction.

Example 2

The method according to Example 1, wherein the beam direction change information comprises angle change information of a transmission beam, or angle change information of the reception beam.

Example 3

The method according to Example 2, further comprising:
determining the second reception beam direction in accordance with the first reception beam direction and the angle change information of the transmission beam; or
determining the second reception beam direction in accordance with the first reception beam direction and the angle change information of the reception beam.

Example 4

The method according to Example 1, wherein the beam direction change information comprises information of a transmission beam direction, or information of the second reception beam direction.

Example 5

The method according to any one of Examples 1-4, further comprising:
determining movement information of the UE; and
determining the second reception beam direction based on the beam direction change information and the movement information of the UE.

Example 6

The method according to any one of Examples 1-5, further comprising: obtaining a reception beam parameter corresponding to second beam direction.

Example 7

The method according to Example 6, wherein the adjusting the reception beam to the second reception beam direction comprises: adjusting the reception beam based on the reception beam parameter.

Example 8

The method according to Example 7, wherein the adjusting the reception beam based on the reception beam parameter comprises: shifting a phase shifter or an amplifier based on the second reception beam parameter.

Example 9

The method according to any one of Examples 1-8, wherein the beam direction change information comprises azimuth angle information and elevation angle information.

Example 10

The method according to Examples 1-7, comprising:
determining reception beam parameters for a plurality of reception beam directions, with the plurality of reception beam directions comprising the first reception beam direction and the second reception beam direction; and
generating a mapping relationship between each reception beam direction and a corresponding reception beam parameter of the reception beam parameters.

Example 11

The method according to claim any one of Examples 1-10, wherein the reception beam parameter comprises a UE antenna index and configuration related to the UE antenna.

Example 12

The method according to Example 1, wherein the beam direction change information comprises polarization change information.

Example 13

The method according to Example 12, each polarization corresponds to a mapping between the reception beam direction and the reception beam parameter.

Example 14

The method according to Example 11, the antenna comprises a plurality of antenna elements of an antenna array.

Example 15

A method performed by a base station, comprising:
transmitting a first communication signal to a user equipment UE through a transmission beam of the base station, with the first communication signal including beam direction change information, with the transmission beam having a first transmission beam direction; and
transmitting a second communication signal through the transmission beam changed to a second transmission beam direction.

Example 16

The method according to Example 15, wherein the beam direction change information comprises angle change information of a transmission beam, or angle change information of the reception beam.

Example 17

The method according to Example 15, wherein the beam direction change information comprises information of the second transmission beam direction, or information of a second reception beam direction.

Example 18

The method according to any one of Examples 15-17, wherein the beam direction change information comprises azimuth angle information and elevation angle information.

Example 19

The method according to any one of Examples 15-18, wherein the beam direction change information comprises polarization change information.

Example 20

A device, comprising:
a non-transitory memory storage comprising instructions; and
one or more processors in communication with the memory, wherein the one or more processors execute the instructions to:
receive first communication signals from a base station using the reception beam having the first reception beam direction, wherein the first communication signals comprise beam direction change information;
adjusting the reception beam from the first reception beam direction to a second reception beam direction in accordance with the beam direction change information; and
receiving second communication signals from the base station based on the reception beam having the second reception beam direction.

Example 21

The device according to Example 20, wherein the beam direction change information comprises angle change information of a transmission beam, or angle change information of the reception beam.

Example 22

The device according to Example 21, wherein the processor is further configured to:
determine the second reception beam direction in accordance with the first reception beam direction and the angle change information of the transmission beam; or
determine the second reception beam direction in accordance with the first reception beam direction and the angle change information of the reception beam.

Example 23

The device according to any one of Examples 21-22, wherein the processor is further configured to:
determine movement information of the UE; and
determine the second reception beam direction based on the beam direction change information and the movement information of the UE.

Example 24

The device according to any one of Examples 21-23, wherein the beam direction change information comprises azimuth angle information and elevation angle information.

Example 25

A non-transitory computer-readable storage medium comprising instructions for causing a processor to:
determine a first reception beam direction of a reception beam;
receive first communication signals from a base station using the reception beam having the first reception beam direction, wherein the first communication signals comprise beam direction change information;
adjusting the reception beam from the first reception beam direction to a second reception beam direction in accordance with the beam direction change information; and
receive second communication signals from the base station based on the reception beam having the second reception beam direction.

Example 26

A device, comprising:
a non-transitory memory storage comprising instructions; and
one or more processors in communication with the memory, wherein the one or more processors execute the instructions to:
determine a first reception beam direction of a reception beam;
receive beam direction change information which is sent from a base station;
instruct to adjust the reception beam from the first reception beam direction to a second reception beam direction in accordance with the beam direction change information.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method performed by a user equipment (UE), comprising:
receiving first communication signals from a base station using a reception beam having a first reception beam direction, wherein the first communication signals comprise beam direction change information indicating a difference in direction between the first reception beam and a second reception beam having a second reception beam direction, the change information based on a change in orientation of a transmission beam at the base station due to a change in orientation of a base station antenna;
determining whether to obtain movement information of the UE and
if movement information of the UE is obtained, determining the second reception beam direction based on the direction change information and the movement information;
if movement of the UE is not obtained, determining the second reception beam direction based on the direction change information;
determining whether polarizing change information is received from the base station and if polarizing change information is received from the base station, setting the second reception beam polarization based on the second beam direction; and adjusting the reception beam from the first reception beam direction to the second reception beam direction; and receiving second communication signals from the base station using the second reception beam having the second reception beam direction.

2. The method according to claim 1, wherein the beam direction change information comprises angle change information of the transmission beam, or angle change information of the reception beam.

3. The method according to claim 2, further comprising:
determining the second reception beam direction in accordance with the first reception beam direction and the angle change information of the transmission beam; or
determining the second reception beam direction in accordance with the first reception beam direction and the angle change information of the reception beam.

4. The method according to claim 1, wherein the beam direction change information comprises information of the transmission beam direction, or information of the second reception beam direction.

5. The method according to claim 1, further comprising:
obtaining a reception beam parameter corresponding to the second beam direction.

6. The method according to claim 5, wherein the adjusting the reception beam from the first beam direction to the second reception beam direction comprises:
adjusting the reception beam based on the reception beam parameter corresponding to the second beam direction.

7. The method according to claim 6, wherein the adjusting the reception beam based on the reception beam parameter comprises: adjusting a phase shifter or an amplifier based on the second reception beam parameter corresponding to the second beam direction.

8. The method according to claim 5, wherein the reception beam parameter comprises a UE antenna index and configuration related to the UE antenna.

9. The method according to claim 8, the antenna comprises a plurality of antenna elements of an antenna array.

10. The method according to claim 5, wherein the beam direction change information comprises polarization change information.

11. The method according to claim 10, each polarization corresponds to a mapping between the reception beam direction and the reception beam parameter.

12. The method according to claim 1, wherein the beam direction change information comprises azimuth angle information and elevation angle information.

13. The method according to claim 1, comprising:
determining reception beam parameters for a plurality of reception beam directions, with the plurality of reception beam directions comprising the first reception beam direction and the second reception beam direction; and
generating a mapping relationship between each reception beam direction and a corresponding reception beam parameter of the reception beam parameters.

14. The method according to claim 1, wherein the second communication signals comprise polarization change information.

15. A user equipment (UE), comprising:
a non-transitory memory storage comprising instructions; and
one or more processors in communication with the memory, wherein the one or more processors cause the UE to execute the instructions to:
receive first communication signals from a base station using a reception beam having a first reception beam direction, wherein the first communication signals comprise beam direction change information indicating a difference in direction between the first reception beam and a second reception beam having a second reception beam direction, the change information based on a change in orientation of a transmission beam at the base station due to a change in orientation of a base station antenna;
determine whether to obtain movement information of the UE and
if movement information of the UE is obtained, determine the second reception beam direction based on the direction change information and the movement information;
if movement of the UE is not obtained, determine the second reception beam direction based on the direction change information;
determine whether polarizing change information is received from the base station and if polarizing change information is received from the base station, set the second reception beam polarization based on the second beam direction; and
adjust the reception beam from the first reception beam direction to a second reception beam direction; and
receive second communication signals from the base station using the reception beam having the second reception beam direction.

16. The UE according to claim 15, wherein the beam direction change information comprises angle change information of the transmission beam, or angle change information of the reception beam.

17. The UE according to claim 16, wherein the one or more processors further cause the UE to execute the instructions to:
determine the second reception beam direction in accordance with the first reception beam direction and the angle change information of the transmission beam; or
determine the second reception beam direction in accordance with the first reception beam direction and the angle change information of the reception beam.

18. The UE according to claim 16, wherein the beam direction change information comprises azimuth angle information and elevation angle information.

* * * * *